(12) United States Patent
Satomi et al.

(10) Patent No.: US 7,533,125 B2
(45) Date of Patent: May 12, 2009

(54) MANAGING A DATA FILE WITH AN ACCESS CODE

(75) Inventors: Hiroshi Satomi, Kanagawa (JP); Satoshi Igeta, Kanagawa (JP); Atsushi Inoue, Tokyo (JP); Satoshi Watanabe, Tokyo (JP); Kenichiro Matsuura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 364 days.

(21) Appl. No.: 10/254,516

(22) Filed: Sep. 26, 2002

(65) Prior Publication Data

US 2003/0065647 A1 Apr. 3, 2003

(30) Foreign Application Priority Data

Sep. 28, 2001 (JP) ............................. 2001-300585

(51) Int. Cl.
G06F 7/00 (2006.01)
G06F 17/00 (2006.01)
(52) U.S. Cl. .................................... 707/104.1; 707/200
(58) Field of Classification Search ................... 707/10, 707/9; 709/203; 717/167; 713/150; 380/200
See application file for complete search history.

(56) References Cited

U.S. PATENT DOCUMENTS

| | | | | |
|---|---|---|---|---|
| 6,018,774 A | | 1/2000 | Mayle et al. ................. 709/250 |
| 6,374,402 B1 * | | 4/2002 | Schmeidler et al. .......... 717/167 |
| 6,389,397 B1 * | | 5/2002 | Otto ........................... 704/270 |
| 6,493,677 B1 * | 12/2002 | von Rosen et al. ............. 705/27 |
| 6,529,909 B1 * | 3/2003 | Bowman-Amuah .......... 707/10 |
| 6,631,397 B1 * | 10/2003 | Satomi et al. ................ 709/203 |
| 6,686,838 B1 * | 2/2004 | Rezvani et al. .............. 340/506 |
| 6,763,370 B1 * | 7/2004 | Schmeidler et al. .......... 709/203 |
| 6,845,388 B1 * | 1/2005 | Philyaw ...................... 709/204 |
| 7,120,687 B1 * | 10/2006 | Tessman et al. .............. 709/224 |
| 7,197,513 B2 * | 3/2007 | Tessman et al. ........... 707/104.1 |
| 2001/0001865 A1 | 5/2001 | Barraclough et al. ........ 709/206 |
| 2002/0099952 A1 * | 7/2002 | Lambert et al. .............. 713/200 |

FOREIGN PATENT DOCUMENTS

| | | |
|---|---|---|
| EP | 0 978 839 | 2/2000 |
| JP | 11-024687 | 1/1999 |
| JP | 11-203359 | 7/1999 |
| JP | 2001-509617 | 7/2001 |
| JP | 2001-264891 | 9/2001 |

OTHER PUBLICATIONS

U.S. Appl. No. 10/254,573, filed Sep. 26, 2002.

(Continued)

*Primary Examiner*—Apu M Mofiz
*Assistant Examiner*—Susan Y Chen
(74) *Attorney, Agent, or Firm*—Fitzpatrick, Cella, Harper & Scinto

(57) ABSTRACT

A server apparatus which retains a data file transferred from a predetermined user through a network and provides an access service for the data file through the network is disclosed, in which unauthorized access to the data file can be prevented with a low processing load. When the third party is permitted to access the data file, the server apparatus according to this invention encrypts and generates an access code required for access on the basis of information managed in the server apparatus to specify the data file.

9 Claims, 38 Drawing Sheets

OTHER PUBLICATIONS

U.S. Appl. No. 10/254,526, filed Sep. 26, 2002.
U.S. Appl. No. 10/254,518, filed Sep. 26, 2002.
U.S. Appl. No. 10/254,675, filed Sep. 26, 2002.
U.S. Appl. No. 10/254,570, filed Sep. 26, 2002.
"Challenging DPE and to make photo albums! A latest technique for using digital images, Using internet", PC Style 21, by Mainichi Communications Inc., Jul. 18, 2000, vol. 1, No. 8, pp. 149-153, with its partial English-language translation and comment.
"Challenging DPE and to make photo albums! A latest technique for using digital images, Using internet", PC Style 21, by Mainichi Communications Inc., Jul. 18, 2000, vol. 1, No. 8, pp. 149-153, with its partial English-language translation and comment.
M. Nakamura, "Configuring small scale WWW server system (4), Data process linked with WWW and browser", Interface, by CG 167, with its partial English-language translation and comment., Jan. 1997.

* cited by examiner

FIG. 3

CUSTOMER INFORMATION DATA TABLE 400

| ITEM | TYPE | |
|---|---|---|
| USER ID | INTEGER TYPE | ~401 |
| DESTINATION E-MAIL ADDRESS | CHARACTER TYPE 64 BYTES | ~402 |
| Login Name | CHARACTER TYPE 64 BYTES | ~403 |
| Password | CHARACTER TYPE 64 BYTES | ~404 |
| NAME(LAST NAME) | CHARACTER TYPE 64 BYTES | ~405 |
| NAME(FIRST NAME) | CHARACTER TYPE 64 BYTES | ~406 |
| PHONETIC TRANSCRIPTIONS IN KANA (LAST NAME) | CHARACTER TYPE 64 BYTES | ~407 |
| PHONETIC TRANSCRIPTIONS IN KANA (FIRST NAME) | CHARACTER TYPE 64 BYTES | ~408 |
| ZIP CODE 1 | CHARACTER TYPE 8 BYTES | ~409 |
| ZIP CODE 2 | CHARACTER TYPE 8 BYTES | ~410 |
| MUNICIPAL DIVISION CODE | INTEGER TYPE | ~411 |
| ADDRESS 1 | CHARACTER TYPE 256 BYTES | ~412 |
| ADDRESS 2 | CHARACTER TYPE 256 BYTES | ~413 |
| TELEPHONE NUMBER 1 | CHARACTER TYPE 8 BYTES | ~414 |
| TELEPHONE NUMBER 2 | CHARACTER TYPE 8 BYTES | ~415 |
| TELEPHONE NUMBER 3 | CHARACTER TYPE 8 BYTES | ~416 |
| USER REGISTRATION STATE | INTEGER TYPE | ~417 |

FIG. 4

CUSTOMER STATE DATA TABLE 500

| ITEM | TYPE | |
|---|---|---|
| USER ID | INTEGER TYPE | ~501 |
| LASTLY DISPLAYED ALBUM ID | INTEGER TYPE | ~502 |
| MAXIMUM DISK CAPACITY | INTEGER TYPE | ~503 |
| CUMULATIVE POINT | INTEGER TYPE | ~504 |

CUSTOMER ALBUM DATA TABLE

| ITEM | TYPE | |
|---|---|---|
| USER ID | INTEGER TYPE | ~601 |
| ALBUM ID | INTEGER TYPE | ~602 |
| ALBUM DISPLAY ORDINAL NUMBER | INTEGER TYPE | ~603 |

FIG. 6

ALBUM INFORMATION DATA TABLE 700

| ITEM | TYPE |
|---|---|
| ALBUM ID | INTEGER TYPE |
| ALBUM NAME | CHARACTER TYPE 64 BYTES |
| COMMENT(FILE PATH) | CHARACTER TYPE 256 BYTES |
| DISCLOSURE PERMISSION/INHIBITION | INTEGER TYPE |
| PASSWORD PERMISSION/INHIBITION | INTEGER TYPE |
| ALBUM PASSWORD | CHARACTER TYPE 64 BYTES |
| PRINT PERMISSION/INHIBITION | INTEGER TYPE |
| ORIGINAL IMAGE DISPLAY PERMISSION/INHIBITION | INTEGER TYPE |
| DISPLAY FORM NUMBER | INTEGER TYPE |

FIG. 7

ALBUM IMAGE DATA TABLE

| ITEM | TYPE | |
|---|---|---|
| ALBUM ID | INTEGER TYPE | ~801 |
| IMAGE ID | INTEGER TYPE | ~802 |
| IMAGE DISPLAY NUMBER | INTEGER TYPE | ~803 |

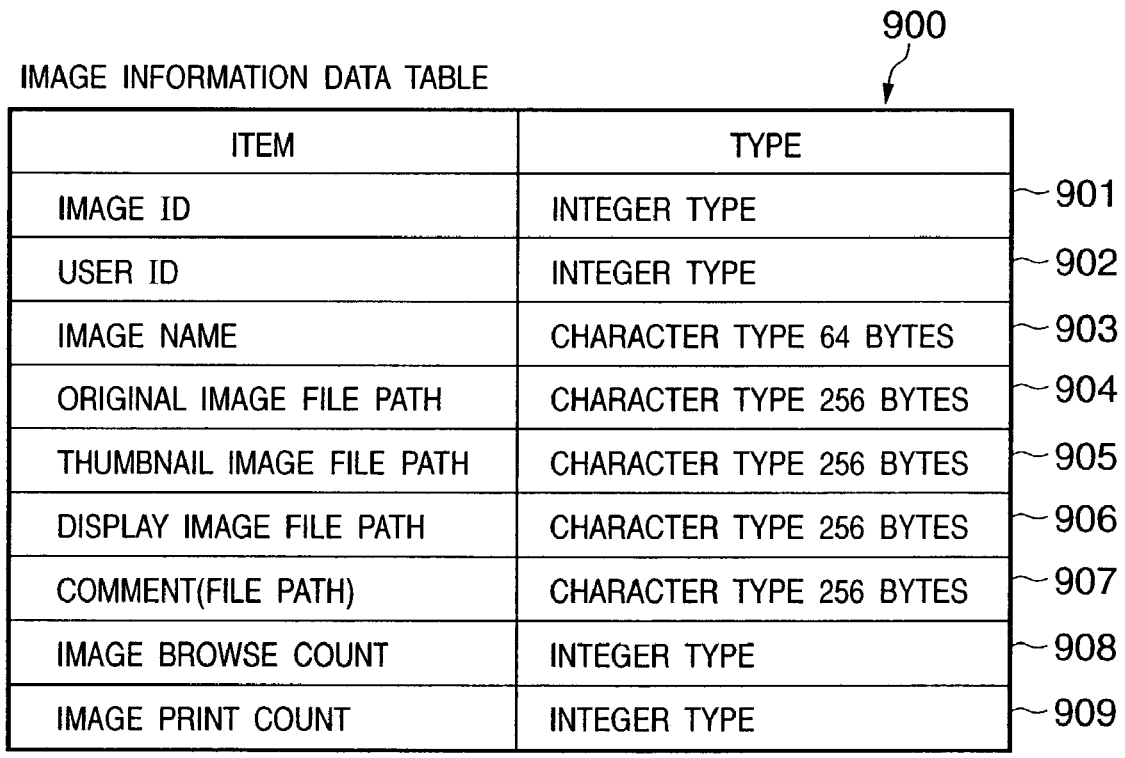

IMAGE INFORMATION DATA TABLE

| ITEM | TYPE | |
|---|---|---|
| IMAGE ID | INTEGER TYPE | ~901 |
| USER ID | INTEGER TYPE | ~902 |
| IMAGE NAME | CHARACTER TYPE 64 BYTES | ~903 |
| ORIGINAL IMAGE FILE PATH | CHARACTER TYPE 256 BYTES | ~904 |
| THUMBNAIL IMAGE FILE PATH | CHARACTER TYPE 256 BYTES | ~905 |
| DISPLAY IMAGE FILE PATH | CHARACTER TYPE 256 BYTES | ~906 |
| COMMENT(FILE PATH) | CHARACTER TYPE 256 BYTES | ~907 |
| IMAGE BROWSE COUNT | INTEGER TYPE | ~908 |
| IMAGE PRINT COUNT | INTEGER TYPE | ~909 |

USER REGISTRATION WINDOW — 2100

- E-MAIL ADDRESS : — 2101
- Login Name : — 2102
- PASSWORD : — 2103

NAME
- LAST NAME : — 2104   FIRST NAME : — 2105
- PHONETIC TRANSCRIPTIONS IN KANA :
- LAST NAME : — 2106   FIRST NAME : — 2107

ADDRESS
- 〒 2108 — 2109
- MUNICIPAL DIVISION : — 2110
- CITY/DISTRICT/TOWN/VILLAGE NAME, TOWN NAME/STREET NUMBER, etc : — 2111
- APARTMENT/CONDOMINIUM NAME, ROOM NUMBER, etc : — 2112

TELEPHONE NUMBER — 2113
— 2114 — 2115

CANCEL — 2117
REGISTER — 2116

F I G. 15
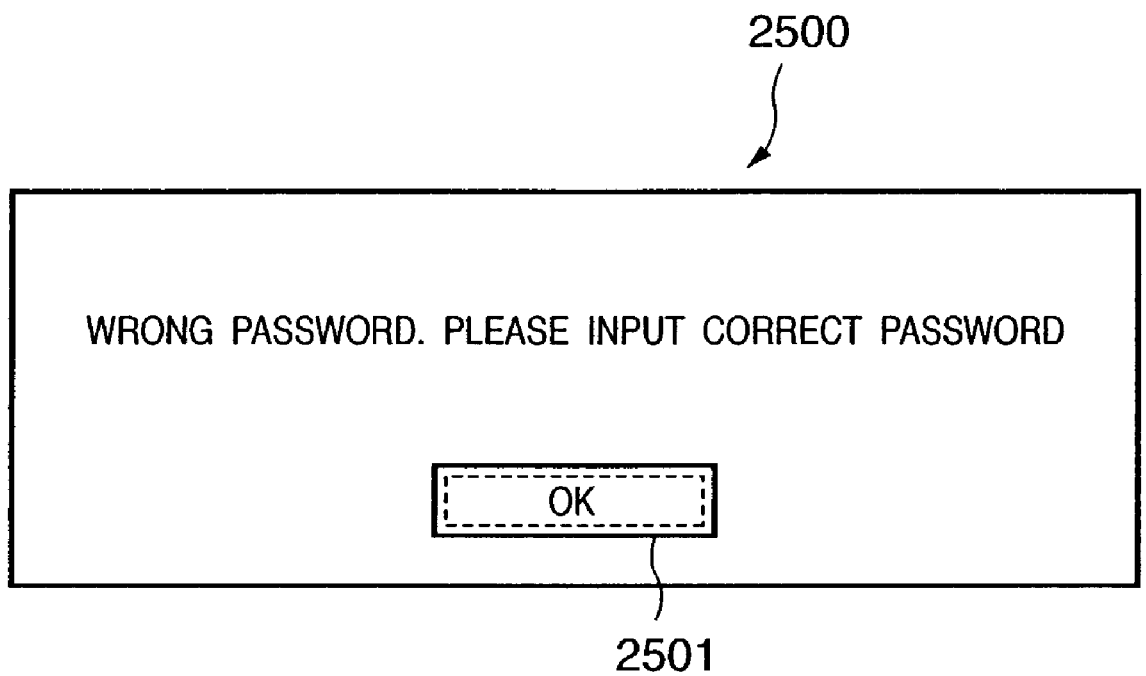

FIG. 16

```
USER INFORMATION CONFIRMATION WINDOW

MR. TARO KIYANON
YOU ARE REGISTERED IN SITE

YOUR LOGIN NAME IS △△△△@◇◇◇◇.ne.jp

REGISTERED CONTENT IS
DESTINATION E-MAIL ADDRESS : △△△△@◇◇◇◇.ne.jp
ADDRESS : 〒AAA-BBBB ○○CHO 1-1-2, ○○KU, TOKYO
TELEPHONE NUMBER : 03-XXXX-XXXX

PLEASE NOTE THAT THE ABOVE INFORMATION IS ALSO SENT TO YOUR
DESTINATION E-MAIL ADDRESS

[CONFIRM]    [CORRECT]
```

2600 (window), 2601 (CONFIRM), 2602 (CORRECT)

FIG. 17

Date : Sat; 23 Jun 2001 12:13:37 +0900
Date : Site (×××@○○○.com)
To : △△△△@◇◇◇◇.ne.jp
Subject : [USER REGISTRATION CONFIRMATION] YOU ARE REGISTERED
Content-Type : text/plain ; charset="ISO-2022-JP"
Content-Transfer-Encoding : 7bit

MR. TARO KIYANON

YOU ARE REGISTERED IN SITE

YOUR LOGIN NAME IS △△△△@◇◇◇◇.ne.jp

REGISTERED CONTENT IS
DESTINATION E-MAIL ADDRESS : △△△△@◇◇◇◇.ne.jp
ADDRESS : 〒AAA-BBBB ○○CHO 1-1-2, ○○KU, TOKYO
TELEPHONE NUMBER : 03-XXXX-XXXX

IF YOU DID NOT REGISTER, PLEASE CONTACT xxx-support@○○○.com

FIG. 27

```
Date : Sat. 23 Jun 2001 02:34:55 +0900
From : PhotoSite (△△△@canon.co.jp)
To : aaa@○○.ne.jp
Subject : ALBUM DISCLOSURE NOTIFICATION
Error-to : △△△@canon.co.jp
Content-Type : text/plain ; charset="TSO-2022-JP"
Content-Transfer-Encoding : 7bit YOU CAN BROWSE DISCLOSURE ALBUM AT PHOTOSITE WITH THE FOLLOWING URL:
http://www.○○○.com/PhotoSite/UserAlbum/AlbumEntry.cgi?AlbumID=AJNWDMF
                                                              ～6201
YOU CAN ALSO BROWSE ALBUM FROM
http://www.○○○.com/PhotoSite/
BY DESIGNATING THE FOLLOWING NUMBER AT ALBUM ID:
ALBUM ID: AJNWDMF ～6203

— MESSAGE FORM SENDER —
THANK YOU FOR YOUR PATRONAGE. THE PICTURES TAKEN AT THE PRODUCT
BRIEFING THE OTHER DAY WERE UPLOADED. PLEASE LET ME KNOW WHEN
YOU SEE THEM.
— END OF MESSAGE —
```

FIG. 29

PORTABLE TERMINAL BUTTON/ALPHABET LIST

| Button | Letters | AL |
|---|---|---|
| 1 |  | 0 |
| 2 | ABC | 3 |
| 3 | DEF | 3 |
| 4 | GHI | 3 |
| 5 | JKL | 3 |
| 6 | MNO | 3 |
| 7 | PQRS | 4 |
| 8 | TUV | 3 |
| 9 | WXYZ | 4 |

←— 6400

F I G. 32
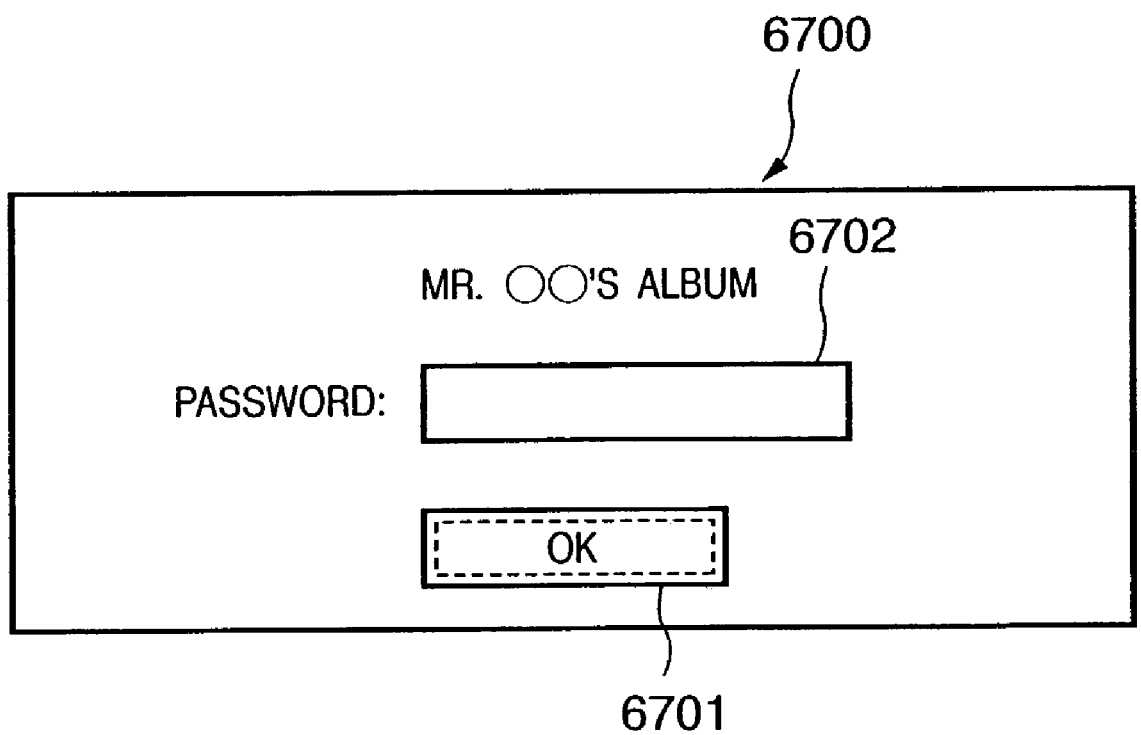

MANAGING A DATA FILE WITH AN ACCESS CODE

FIELD OF THE INVENTION

The present invention relates to a server apparatus which retains a data file transferred from a predetermined user through a network and provides an access service for the data file through the network and a control method for the apparatus and, more particularly, to a server apparatus which can prevent unauthorized access to the data file with a low processing load and a control method for the apparatus.

The present invention also relates to a communication terminal which can communicate with the server apparatus of the present invention and a control method for the terminal.

BACKGROUND OF THE INVENTION

Recently, with improvements in communication environments and advances in information communication techniques, information providing services and information using services which use computer networks such as the Internet can be provided. In multimedia environments in which all data, e.g., text data, image data, and sound data, are digitized, in particular, since information can be shared and provided, many information providing services have been offered through the Internet.

Creating the image input by a digital camera or scanner as electronic data and storing the data in a recording medium such as an HDD, CD-R, or the like of a personal computer have already become general operations.

As described above, with rapid improvements in Internet connection environments (improvements in communication environment and the function of connection devices and reductions in cost), there have appeared application service providers (to be referred to as photosites hereinafter) which provide services like keeping the image data photographed by users using image input devices in storage areas in servers on the Internet and allowing the users to browse the image data again at the time they require it or processing the image data, and print service providers (to be referred to as printsites hereinafter) which provide services of printing electronic documents such as the New Year's cards, wordprocessed documents, and images.

In these photosites, a system is generally constructed in which an access code of some kind is added to the image uploaded (transferred) by a user to allow a user who inputs the access code to browse the image.

On the photosite, when an access code is input, a database is searched for an image corresponding to the access code. If the image is found, the image is displayed. Some user who does not know the access code for the image may try to illicitly see the image by randomly inputting access codes for mischief or curiosity. In order to prevent the unspecified third party from accessing the image by using such illicit operation, for example, setting of a password is generally allowed in correspondence with an access code on the photosite side. An image for which a password is set cannot be browsed unless the proper password is input, thus allowing only authorized users to browse the image.

As described above, images can be protected against unauthorized access by the method of protecting image browsing by using passwords or the like. However, a user who tries to illicitly access an image by inputting access codes for mischief and curiosity inputs many access codes and/or passwords in a short period of time, expecting casual coincidence. In the photosite, every time a password is input, a database is accessed to check whether the input value is correct or not. If, therefore, many passwords are input in a short period of time, the database is frequently accessed, resulting in a deterioration in the performance of a server computer (photosite server) as a component of the photosite server.

SUMMARY OF THE INVENTION

The present invention has been made in consideration of such problems in the prior art, and has as its object to provide a server apparatus which retains a data file transferred from a predetermined user through a network and provides an access service for the data file through the network and a control method for the apparatus, in which unauthorized access to the data file can be prevented with a low processing load.

It is another object of the present invention to provide a communication terminal which can communicate with the server apparatus of the present invention and a control method for the terminal.

To achieve the above object, according to an aspect of the present invention, a server apparatus which retains a data file transferred through a network and provides an access service for the data file through the network, characterized by comprising: data management means for managing the data file together with internal management information; and access code generating means for generating an access code required to access the data file by using the internal management information managed by the data management means.

To achieve the above object, according to another aspect of the present invention, a communication terminal which can communicate with the server apparatus of the present invention through the network, characterized by comprising: determination means for determining whether the access code is an authorized access code.

To achieve the above object, according to a further aspect of the present invention, a network system in which a server apparatus which retains a data file transferred through a network and provides an access service for the data file through the network and a communication terminal are so connected as to communicate with each other, characterized by the server apparatus comprising: data management means for managing the data file together with internal management information; and access code generating means for generating an access code required to access the data file by using the internal management information managed by the data management means.

To achieve the above object, according to a still further aspect of the present invention, a control method for a server apparatus which retains a data file transferred through a network and provides an access service for the data file through the network, characterized by comprising: the data management step of managing the data file together with internal management information; and the access code generating step of generating an access code required to access the data file by using the internal management information managed in the data management step.

To achieve the above object, according to another aspect of the present invention, a control method for a communication terminal which can communicate with the server apparatus of the present invention through the network, characterized by comprising the determination step of determining whether the access code is an authorized access code.

To achieve the above object, according to another aspect of the present invention, a computer program characterized by causing a computer apparatus to serve as a server apparatus which retains a data file transferred through a network and provides an access service for the data file through the network, the server apparatus comprising: data management means for managing the data file together with internal management information; and access code generating means for generating an access code required to access the data file by using the internal management information managed by the data management means.

To achieve the above object, according to another aspect of the present invention, a computer program characterized by causing a computer apparatus to serve as a communication terminal which can communicate with the server apparatus of the present invention through the network, the communication terminal comprising determination means for determining whether the access code is an authorized access code.

To achieve the above object, according to another aspect of the present invention, a computer-readable storage medium characterized by storing the computer program of the present invention.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view showing an example of the arrangement of a customer information data table managed by the photosite server according to the embodiment of the present invention;

FIG. 4 is a view showing an example of the arrangement of a customer state data table managed by the photosite server according to the embodiment of the present invention;

FIG. 6 is a view showing an example of the arrangement of an album information data table managed by the photosite server according to the embodiment of the present invention;

FIG. 7 is a view showing an example of the arrangement of an album image data table managed by the photosite server according to the embodiment of the present invention;

FIG. 8 is a view showing an example of the arrangement of an image information data table managed by the photosite server according to the embodiment of the present invention;

FIG. 11 is a view showing an example of the user registration window transmitted from the photosite server according to the embodiment of the present invention;

FIG. 15 is a view showing an example of the error window transmitted from the photosite server when the re-input password differs from a set password in the user registration processing in FIG. 10;

FIG. 16 is a view showing an example of the user registration confirmation window transmitted from the photosite server in the user registration processing in FIG. 10;

FIG. 17 is a view showing an example of the contents of e-mail transmitted at the time of user registration in the user registration processing in FIG. 10;

FIG. 27 is a view showing an example of album notification mail transmitted from the photosite server according to this embodiment of the present invention;

FIG. 29 is a view showing an example of the relationship between the buttons of a portable terminal that can be used as a portable terminal in the network system in FIG. 1 and the characters assigned to the buttons;

FIG. 32 is a view showing an example of the album browse start window transmitted from the photosite server according to the embodiment of the present invention;

DETAILED DESCRIPTION OF THE PREFERRED EMBODIMENT

A preferred embodiment of the present invention will now be described in detail in accordance with the accompanying drawings.

The following embodiment will exemplify a server apparatus which forms the above photo sharing site on the Internet as an embodiment of the server apparatus according to the present invention. However, the present invention is not limited to server apparatuses which form photo sharing sites and can be applied to server apparatuses used for arbitrary purposes as long as they are designed to provide users with predetermined amounts of storage capacities. The computer network to which the server apparatus is connected is not limited to the Internet. It is, however, preferable that such a network be a computer network using a so-called Internet protocol group including TCP/IP and the like.

(Overall Arrangement)

Figure 1:
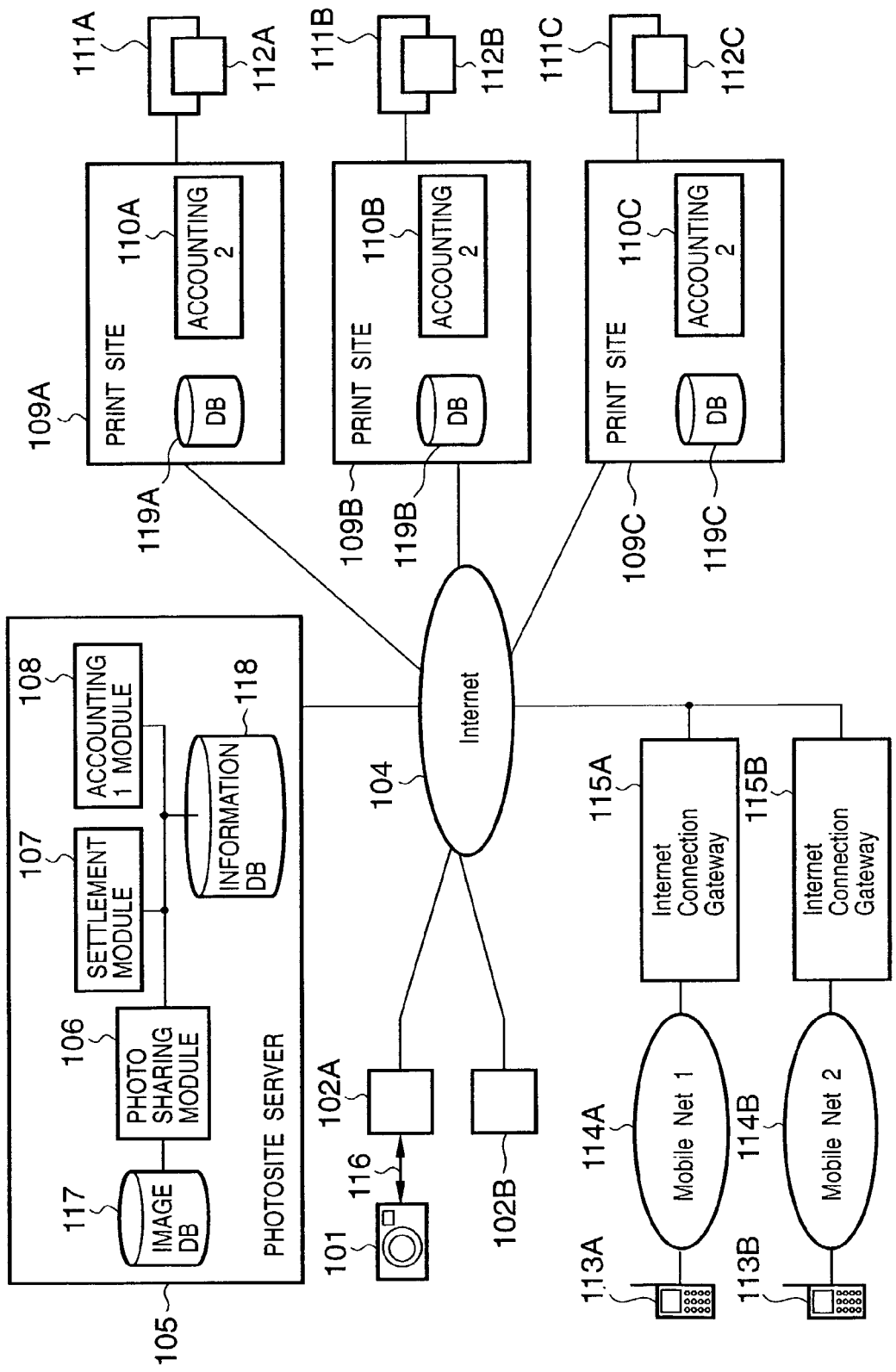
FIG. 1 is a block diagram showing an example of the overall arrangement of a network system using a photosite server according to an embodiment of the present invention.

FIG. 1 is a block diagram showing an example of the overall arrangement of a network system having a photo sharing site (photosite) using the server apparatus according to this embodiment.

Referring to FIG. 1, reference numeral 101 denotes an image input apparatus which is, for example, a digital still camera capable of photographing still images and recording the images as image data or a digital video camera capable of photographing moving images and recoding images as moving image data. This apparatus converts an optical image as image information into an electrical signal, performs predetermined image processing, and then records/reproduces the resultant information as digital information.

Reference numeral 102 denotes a computer device (to be referred to as a user PC hereinafter) such as a personal computer used by a user; and 116, a data transfer interface for transferring the image data photographed by the image input apparatus 101 between the image input apparatus 101 and the user PC 102. The data transfer interface 116 may be a wire interface represented by USB (Universal Serial Bus) or IEEE1394 or a wireless interface represented by IrDA or Bluetooth.

The image data photographed by the image input apparatus 101 and stored as digital information is transferred to a storage area in an information storage unit represented by the HDD (Hard Disc Drive) of the user PC 102. Image data transfer from the image input apparatus 101 to the user PC 102 is done in the following two cases. In the first case, in accordance with an instruction from the OS or dedicated software installed in the user PC 102, the image data stored in an information storage unit such as a memory or HDD in the image input apparatus 101 are transferred at once. In the second case, in response to the transfer command transmitted from the image input apparatus 101, the OS or dedicated software in the user PC 102 ensures a data recording area in the information storage unit in the user PC 102 and transfers the image data to the area.

A browser which operates on the user PC 102 and can execute a standard protocol (e.g., FTP or HTTP) capable of information transfer on the Internet 104 accesses a server apparatus (photosite server) 105, which forms a photo sharing site (photosite), by using a standard protocol such as HTTP (HyperText Transfer Protocol), loads/analyzes a file managed by the photosite server 105 and created by a description language such as HTML or XML, and further loads linked multimedia information such as image information and sound information, thereby displaying a Web page. With this operation, the user PC 102 can receive the services provided by the photosite server 105 through the Internet 104. As described later, in order to actually use the photosite server 105, user registration, authentication processing at the time of connection, and the like are required.

The image data photographed by the image input apparatus 101 and stored in the information storage unit in the user PC 102 is transferred to the photosite server 105 in accordance with a request from the user of the user PC 102 (this transfer will be referred to as image upload hereinafter). Image upload includes a case wherein image data to be transferred is selected with the above browser and transferred in synchronism with the action of requesting image upload and a case wherein image data is selected by using image upload software (TFP client software or the like), and the selected data is directly transferred by the image upload software.

In either case, image upload is executed on the basis of a file transfer protocol which can be used on the Internet, e.g., HTTP (RFC1867) or FTP. For this reason, a CGI (Common Gateway Interface) program, TFP server software, and the like which correspond to these protocols are also installed in a photo sharing module 106 in the photosite server 105.

The photo sharing module 106 checks whether uploaded image data is data that can be used in the photosite server 105. Upon determining that the data can be used, the photo sharing module 106 stores the uploaded image data in an image database 117, and the attribute information and the like of the image data in an information database 118. When these data are completely stored, the photo sharing module 106 notifies the user PC 102 that the image data has been properly uploaded.

In the information database 118, in addition to the attribute information of the image data described above, various data are unitarily managed, which include the user attribution information of the registered users of the photosite server 105, the attribute information of print service providers (to be referred to as printsites hereinafter) 109A to 109C who are requested the printing out of uploaded image data, and the like.

An arbitrary management method can be used for uploaded image data. Assume, however, that in this embodiment, a user creates "albums", and image data is registered in each album.

The user of the user PC 102 can browse the image data uploaded in this manner through the Web browser.

(Arrangements of Photosite Server 105 and User PC 102)

In this embodiment, the photosite server 105 and user PC 102 can be realized by general-purpose computers such as personal computers which can be connected to a computer network.

Figure 2:
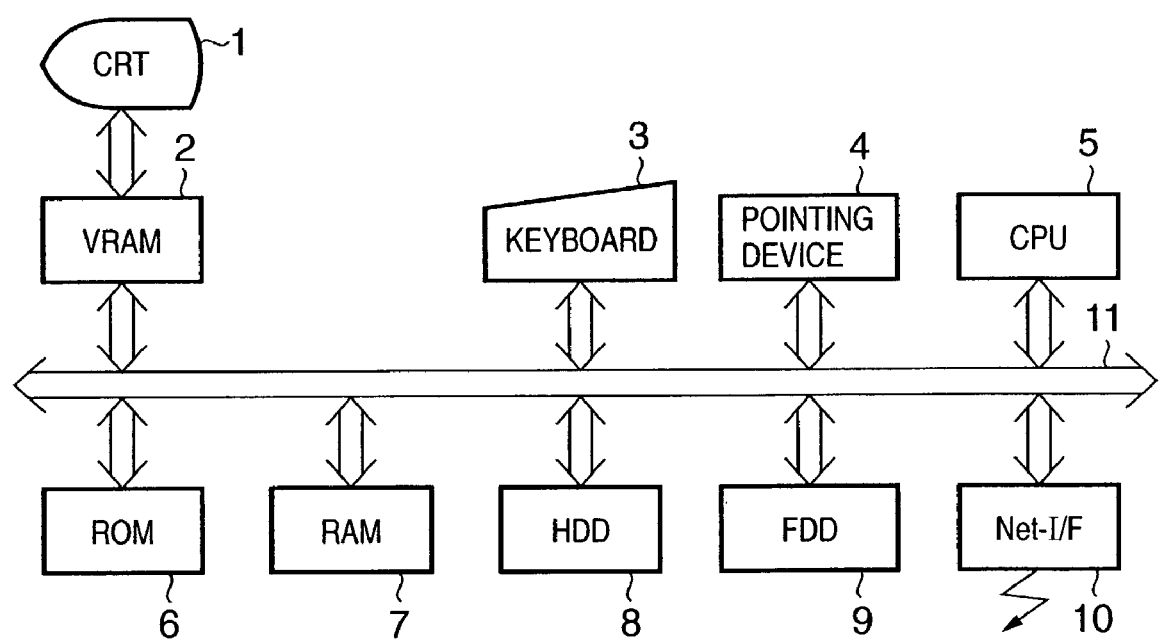
FIG. 2 is a block diagram showing an example of the arrangement of a computer apparatus which can be used as a photosite server or user PC according to the embodiment of the present invention.

FIG. 2 is a block diagram showing an example of the arrangement of a computer apparatus that can be used as the photosite server 105 or user PC 102 in this embodiment.

Referring to FIG. 2, reference numeral 1 denotes a CRT (Cathode Ray Tube) which displays the data that is being processed by an application program, various message menus, and the like; 2, a video RAM (to be referred to as a VRAM hereinafter) which bitmaps an image to be displayed on the screen of the CRT 1; 3 and 4, a keyboard and a pointing device, respectively, which are used to input characters and the like in predetermined columns on the screen and indicate icons, buttons, and the like on a GUI (Graphical User Interface); and 5, a CPU (Central Processing Unit) which performs overall control.

Reference numeral 6 denotes a ROM (Read Only Memory) in which the operation procedures (programs) executed by the CPU 5 are stored. Note that programs associated with the flow charts to be described later, including application programs associated with data processing and error processing programs, are also stored in the ROM 6. Reference numeral 7 denotes a RAM (Random Access Memory) which is used as a work area when the CPU 5 executes the various programs described above and a temporary save area for error processing.

Reference numeral 8 denotes a hard disc drive (to be referred to as an HDD hereinafter); and 9, a floppy disc drive (to be referred to as an FDD hereinafter). These disc drives are used storage areas for an OS, application programs such as a browser, data, libraries, and the like. In place of the FDD or in addition thereto, an optical (magnetic) disc drive such as a CD-ROM, MO, or DVD, a magnetic tape drive such as a tape streamer or DDS, or the like may be used.

Reference numeral 10 denotes a network interface which is used to connect the apparatus to the network; and 11, an I/O bus (constituted by an address bus, data bus, and control bus) which connects the above units to each other.

Such a general-purpose computer apparatus is connected to the Internet 104 through a necessary network device (not shown) such as a modem or router, another computer apparatus, or the like, as needed.

In the photosite server 105 according to this embodiment, the image database 117 and information database 118 shown in FIG. 1 can be realized as predetermined areas in the HDD 8 in FIG. 2 (or independent HDDs). The respective software modules (the photo sharing module 106, a settlement module 107, and an accounting module 108) are stored in a predetermined area in the ROM 6 or HDD 8. Each function can be implemented by making the CPU 5 control necessary constituent elements on the basis of these modules.

The operation of each component of the network system shown in FIG. 1 will be described next in a case wherein the image data uploaded to the photosite server 105 through the Internet 104 and stored in the image database 117 is browsed by a user other than the user who has uploaded the data to the photosite server 105.

In this embodiment, the photosite server 105 provides the third party designated by a user who has uploaded images with browse and print order services with respect to the "uploaded images" or "album that manages a plurality of uploaded images as one archive". The user (to be also referred to as the upload user hereinafter) who has uploaded the image data in the photosite server 105 notifies the photosite server 105, through, for example, a form window or the like on the Web browser displayed on a user PC, of the attribute information of a user (to be referred to as a browse user hereinafter) who is permitted to browse the images uploaded by the upload user, e.g., the name of the browse user and the like, and the e-mail address.

When disclosing images to the browse user, the photosite server 105 creates a URL (Universal Resource Locator) required for disclosure. As the URL to be created at this time, a unique address using a random number or the like that cannot be uniquely predicted is assigned. The following is an example:

http://ooo.com/PhotoSite/Album/
AlbumEntry.cgi?AlbumID=AJNWDMF (Such an URL that cannot be uniquely predicted will be referred to as a random URL hereinafter.)

The photosite server 105 transmits the random URL created in this manner to the e-mail address of the browse user designated by the upload user by creating e-mail to which password information is added as needed. Upon reception of the e-mail, the browse user (e.g., the user of the PC 102B) accesses the Internet 104 from the PC 102B, and inputs the random URL notified by the e-mail to the Web browser. This allows the browse user to browse the images and album designated by the upload user.

The photosite server 105 supports the owners of portable communication terminals such as cell phones as browse users designated by the upload user, and can provide the browse users (portable browse users) who use such portable terminals with browse function and print order services with respect to the images (or album) designated by the upload user. The photosite server 105 creates a random URL for image browsing, and creates/transmits notification e-mail containing this URL. Upon reception of this e-mail, the portable browse user can browse the images or album from the portable terminal and give an order for printing of a browsed image.

More specifically, referring to FIG. 1, the user who has uploaded image data from the user PC 102A to the photosite server 105 through the Internet 104 notifies the photosite server 105 of attribute information of a potable browse user who is permitted to browse, e.g., the name of the portable browse user, and the e-mail address by using, for example the Web browser.

In disclosing images and an album to a portable browse user, the photosite server 105 creates a random URL necessary for disclosure. The photosite server 105 notifies a portable terminal 113A of the portable browse user of the random URL by using e-mail upon adding password information necessary for browsing, as needed. This e-mail notified to the portable browse user is sent out from a mail distribution server in the photosite server 105 to a mobile network 114A, which can exchange various data with the portable terminal 113A, through the Internet 104 and an Internal connection gateway 115A, and is transferred to the portable terminal 113A. Upon reception of the e-mail, the portable browse user accesses the photosite server 105 through the route of the mobile network 114, Internal connection gateway 115A, and Internet 104, by inputting the random URL address notified by the e-mail.

The photosite server 105 has page data dedicated to portable terminals, which is created by a description language dedicated to portable terminals, e.g., WAP, WML, or CompactHTML, in addition to Web information created by a description language such as HTML or XML used to display a homepage on a general computer terminal, and image data re-sized to a size that can be displayed on the portable terminal 113A. In accordance with the access request from the portable terminal 113A, the photosite server 105 discriminates the model of the terminal, and transmits page data that can be displayed on the browser in the portable terminal 113A in accordance with the discrimination result. Pieces of browser information (page data) in various formats are prepared in the photosite server 105 to provide services for portable communication terminals that can browse the browser information, including not only the portable terminal 113A but also the portable terminal 113B that differs from the portable terminal 113A in communication protocol specifications, information description languages, and mobile network environments. For the sake of descriptive convenience, FIG. 1 shows only the two usable portable terminals, namely the portable terminals 113A and 113B. However, the number of portable terminals may be three or more.

A browse request from the portable terminal 113B is sent from a mobile network 114B which is a data communication environment that can be used by the portable terminal 113B to an Internal connection gateway 115B. After protocol conversion, the request is sent to the photosite server 105 connected to the Internet 104. As described above, the photosite server 105 re-sizes image data to a size that can be browsed by the portable terminal 113B, and has page data created by a description language dedicated to portable terminals such as WAP, WML, or CompactHTML. The photosite server 105 discriminates the model of the portable terminal 113A in accordance with the access request therefrom, and transmits information that can be displayed on the portable terminal 113A in accordance with the discrimination result.

As examples of photo services realized by the above system, the following services will be mainly described in detail in this e-mail:

(1) user registration: performing registration to allow the use of the photosite server 105 from the user PC 102 and issuing a user ID;

(2) notification of album: performing e-mail notification to allow another user to browse the album created on the photosite server 105 by the user PC 102;

(3) browsing of album: allowing albums in the photosite server 105 to be browsed from the PC 102B; and (4) browsing of album from portable terminal: allowing albums in the photosite server 105 to be browsed from the portable terminal 113A.

Each of the above services will be described in detail later. Obviously, the services and functions realized by the photo service system according to this embodiment are not limited to those described above.

(Arrangement of Database)

FIGS. 3 to 8 are views showing examples of the data tables managed by the information database 118 of the photosite server 105 according to this embodiment. Note that in the respective data tables, common values are stored in items having the same names (e.g., in data tables associated with the same user, the same value is stored in the user ID items in the tables).

FIG. 3 is a view showing an example of the arrangement a data table associated with the customer information managed by the photosite server 105 in this embodiment. When the user executes user registration to be described later, one record of a user information data table 400 is created and registered in the database 118 to be managed. For a registered user, a unique user ID 401 is defined, and the user information data table 400 is managed by using this user ID 401 as a key.

The information managed as customer information includes a destination mail address 402, login name 403, password 404, name (last name) 405, name (first name) 406, phonetic transcriptions in kana (last name) 407, phonetic transcriptions in kana (first name) 408, zip codes (1, 2) 409 and 410, municipal division code 411, addresses (1, 2) 412 and 413, telephone numbers (1, 2, 3) 414, 415, and 416, and user registration state 417. When the user registration state 417 is 1, it indicates that the user has already been registered and is allowed to use the photosite server. When this information is 0, it indicates that the use of the server is inhibited.

FIG. 4 is a view showing an example of the arrangement of a customer state data table for managing information representing the current state of each user who uses the photosite server 105 in this embodiment. When the user executes user registration to be described later, one record of a user state data table 500 is created and registered in the database 118 to be managed. The value of each time in this record is updated whenever necessary in accordance with the operation performed by the user while using the photosite server 105. The data stored in this customer state data table 500 include, by using a user ID 501 as a key, an album ID 502 of the album that is currently displayed (or lastly displayed), a maximum disc capacity 503 that defines the maximum capacity in the image database 117 which can be used by the user, and a point 504 that is accumulated when the user gives a print order. As described above, the respective data tables for managing the same user have a common user ID. More specifically, the user ID 501 and user ID 401 in the customer information data table 400 and customer state data table 500 associated with the same user are equal in value.

Figure 5:
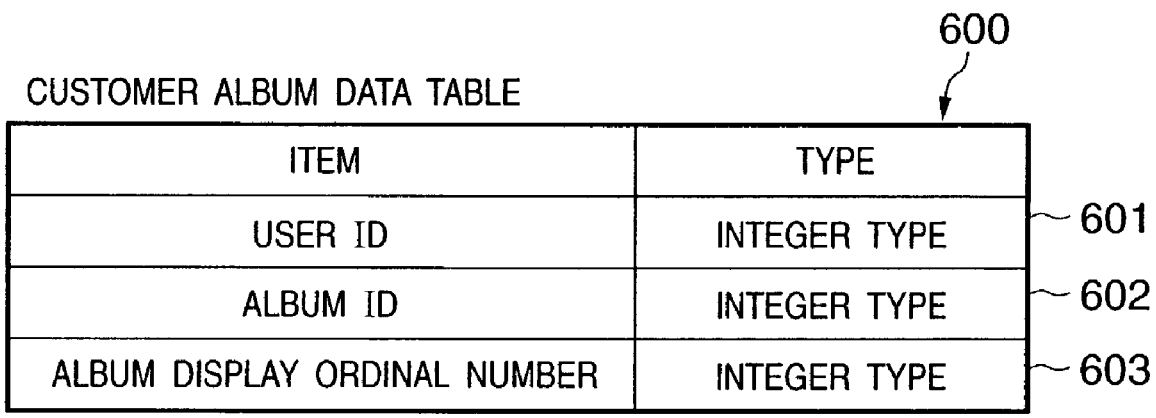
FIG. 5 is a view showing an example of the arrangement of a customer album data table managed by the photosite server according to the embodiment of the present invention.

FIG. 5 is a view showing an example of the arrangement of a customer album data table managed by the photosite server 105 in this embodiment. When the user creates one new album while using the photosite server 105, one record of a customer album data table 600 is created and registered in the database 118 to be managed. When the user deletes an album, the corresponding record is deleted from the information database 118. The data stored in the customer album data table 600 include, by using a user ID 601 of the registered user which serves as a key, an album ID 602 of the album created by the user, and a display ordinal number 603 of the album. Note that with respect to the same user, the value stored in the user ID 601 is equal to that in the user ID 401.

FIG. 6 is a view showing an example of the arrangement of an album information data table managed by the photosite server 105 in this embodiment. When the user creates a new album while using the photosite server 105, one record of an album information data table 700 is created and registered in the information database 118 to be managed. When the user deletes an album, the corresponding record is deleted from the information database 118.

The album information data table 700 manages an album name 702, a file path 703 to a comment on the album, a disclosure permission/inhibition flag 704 for the album, a password permission/inhibition flag 705, an album password 706, a print permission/inhibition flag 707, an original image display permission/inhibition flag 708, and a display form number 709 by using an album ID 701 as a key.

If the disclosure permission/inhibition flag 704 for the album is 1, it indicates that the album can be disclosed. If this flag is 0, it indicates the inhibition of disclosure. If the flag is −1, it indicates that the disclosure of the album is inhibited by the manager of the photosite server 105. If the password permission/inhibition flag 705 is 1, it indicates the presence of a password. If this flag is 0, it indicates the absence of a password. If the password permission/inhibition flag 705 is 1, the password is stored in the album password 706. If the print permission/inhibition flag 707 is 1, it indicates the album can be printed. If this flag is 0, it indicates that the album cannot be printed. If the original image display permission/inhibition flag 708 is 1, it indicates that display operation can be done. If this flag is 0, it indicates that display operation cannot be done. If the display form number 709 is 1, it indicates that the album is displayed in the form of a list. If this flag is 2, it indicates that the album is displayed in detail. Note that with respect to the same album, the value stored in the album ID 701 is equal to that in the album ID 602.

As will be described later, one each of record of the customer album data table 600 and album information data table 700 may be created in the process of user registration and registered in the information database 118.

FIG. 7 is a view showing an example of the arrangement of an album image data table managed by the photosite server 105 in this embodiment. Every time the user uploads one image onto an album, one record of an album image data table 800 is increased and registered in the information database 118 to be managed. When an image is deleted, the corresponding record is deleted from the information database 118. The data managed in the album image data table 800 include an image ID 802 of an image stored in an album having an album ID 801, and an image display number 803 indicating the display position of the image in the album. Note that with respect to the same album, the ID stored in the album ID 801 is equal to that in the album ID 701.

FIG. 8 is a view showing an example of the arrangement of an image information data table managed by the photosite server 105 in this embodiment. Every time the user uploads an image onto an album, one record of an image information data table 900 is created and registered in the information database 118 to be managed. When an image is deleted, the corresponding record is deleted from the information database 118. The image information data table 900 manages a user ID 902 of the user who owns the image, an image name 903, a file path 904 to the original image, a file path 905 to thumbnail image, a file path 906 to a display image, a file path 907 to a comment on the image, an image browse count 908, and an image print count 909 by using an image ID 901 as a key. With respect to the same image, the ID stored in the image ID 901 is equal to that in the image ID 802. With respect to the same user, the ID stored in the user ID 902 is equal to that in the user ID 401.

(Access Processing for Photosite Server 105)

Figure 9:
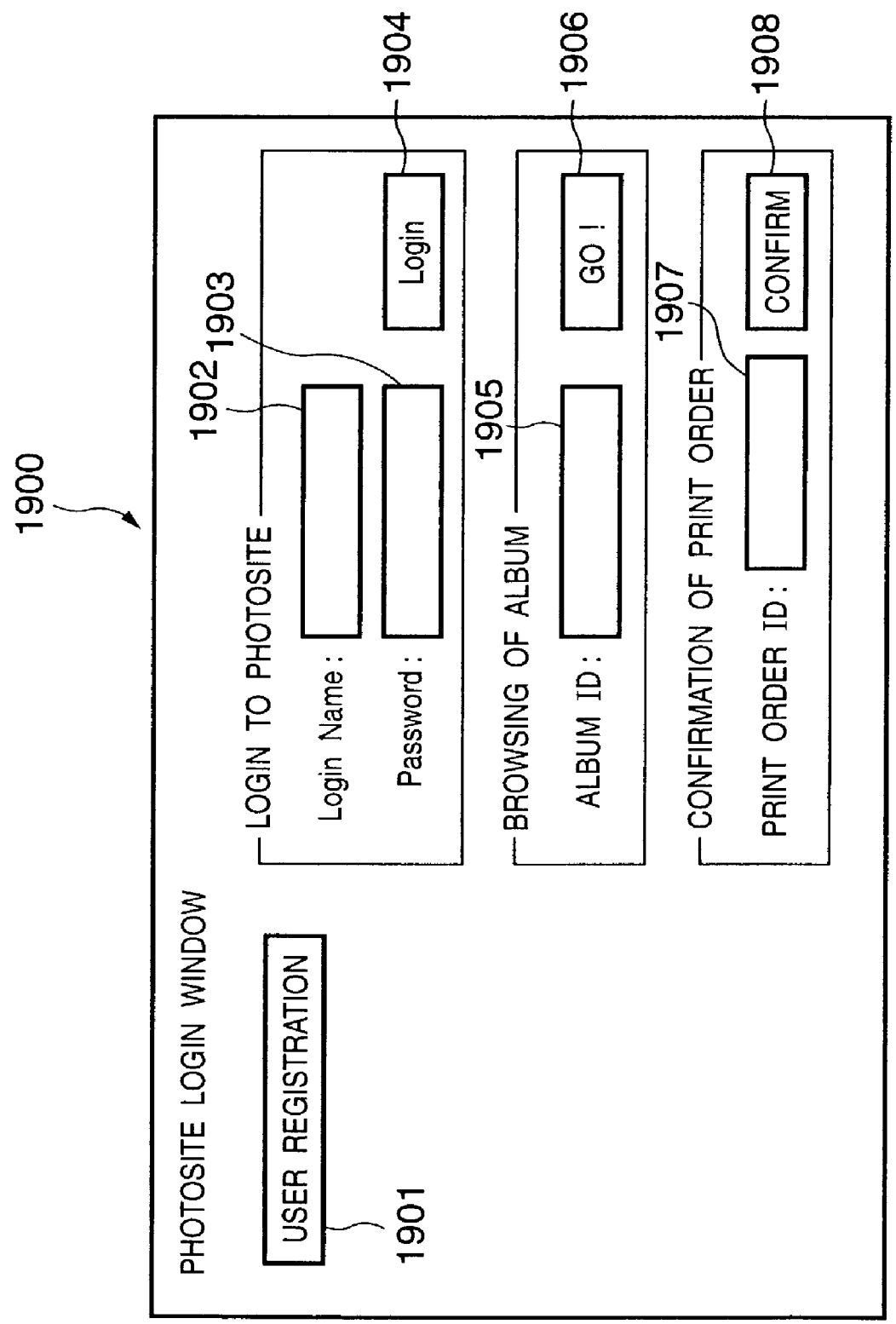
FIG. 9 is a view showing an example of the initial window transmitted from the photosite server according to the embodiment of the present invention.

FIG. 9 shows an example of the initial window displayed on the Web browser in the user PC 102 when a user accesses the photosite server 105 in this embodiment. The areas and buttons arranged on a window 1900 are a user registration button 1901, a login name input area 1902 which is used when the user having undergone user registration uses the photosite server 105, a password input area 1903, a login button 1904, an album ID input area 1905 for album browsing, an album browse button 1906, a print order ID input area 1907 for checking the status of a print order, and a print order confirmation button 1908.

The processing to be performed when each button on the window in FIG. 9 is pressed (clicked with a mouse or the like) will be described below.

(User Registration Processing)

User registration processing will be described first with reference to FIGS. 10 to 17.

Figure 10:
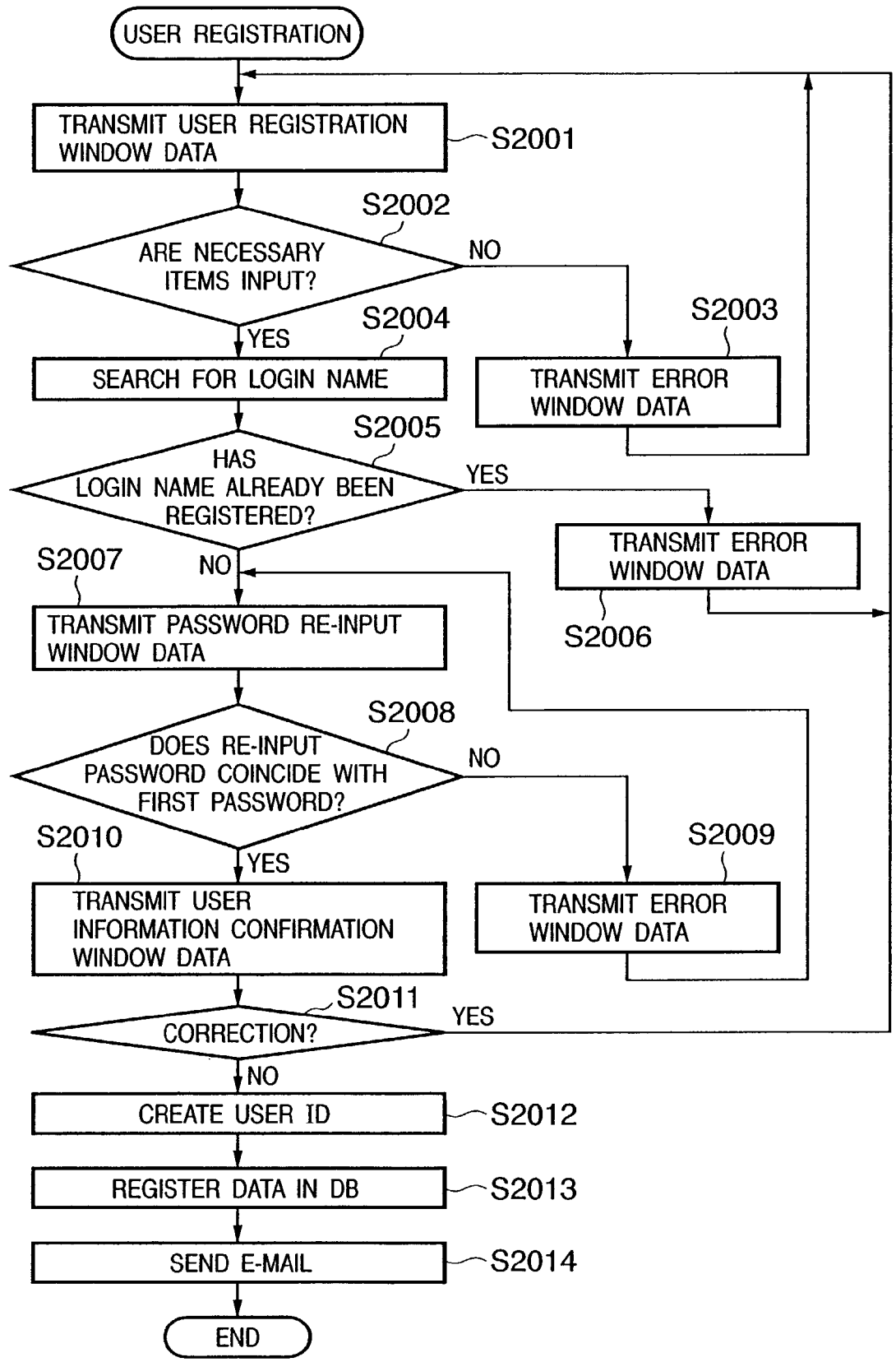
FIG. 10 is a flow chart for explaining user registration processing in the photosite server according to the embodiment of the present invention.

FIG. 10 is a flow chart showing processing in the photosite server 105 at the time of user registration. As described above, the processing shown in FIG. 10 is implemented by making the CPU 5 of a computer apparatus as a component of the photosite server 105 execute necessary software to control the constituent elements in the apparatus.

When the user registration button 1901 on the window 1900 in FIG. 9 is pressed, the photosite server 105 transmits, for example, the display data on the user registration window 2100 shown in FIG. 11 to the user PC 102, thereby starting user registration processing (step S2001).

A user registration window 2100 shown in FIG. 11 includes a notification destination e-mail address input area 2101 for a user to be registered, a login name input area 2102 for the user, a password input area 2103, name input areas 2104 and 2105, input areas 2106 and 2107 for the phonetic transcriptions of the name in kana, zip code input areas 2108 and 2109, a municipal division selection area 2110, address input areas 2111 and 2112, and telephone number input areas 2113 to 2115. Although not shown in the flow chart of FIG. 10, when a cancel button 2117 is pressed, the user registration processing is terminated, and the window 1900 in FIG. 9 is displayed.

When the registration button 2116 on the user registration window 2100 is pressed, it is checked in step S2002 whether data concerning predetermined necessary items have been input. In this embodiment, if all data concerning the e-mail address input area 2101, login name input area 2102, password input area 2103, name input areas 2104 and 2105, and telephone number input areas 2113 to 2115 as necessary items have been input, it is determined that data concerning the necessary items have been input.

Figure 12:
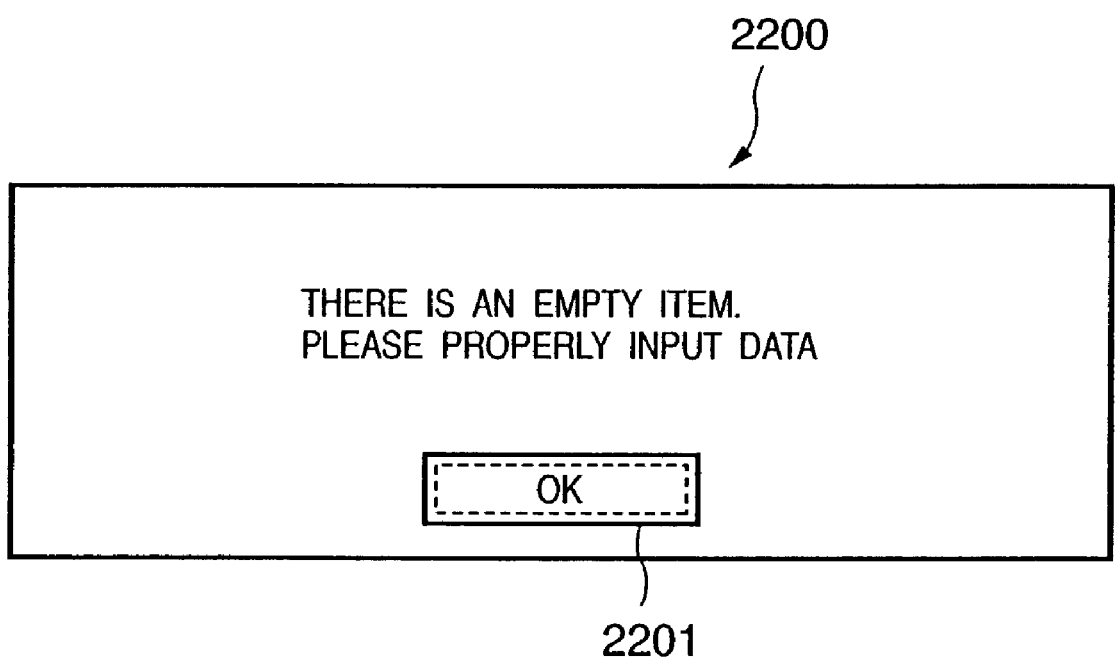
FIG. 12 is a view showing an example of the error window transmitted from the photosite server when data concerning a necessary item is not input in the user registration processing in FIG. 10.

If it is determined in step S2002 that data concerning the necessary times have not been input, error window data is transmitted in step S2003. FIG. 12 shows an example of an error window 2200 displayed on the basis of this error window data. When an OK button 2201 on the error window 2200 is pressed, the flow returns to step S2001 to transmit the display data of the user registration window 2100 again.

If it is determined in step S2002 that data concerning the necessary items have been input, the CPU 5 searches the user information data table 400 managed by the database 118 (step S2004) to check whether the login name input in the login name input area 2102 on the user registration window has already been used by another registered user (step S2005).

Figure 13:
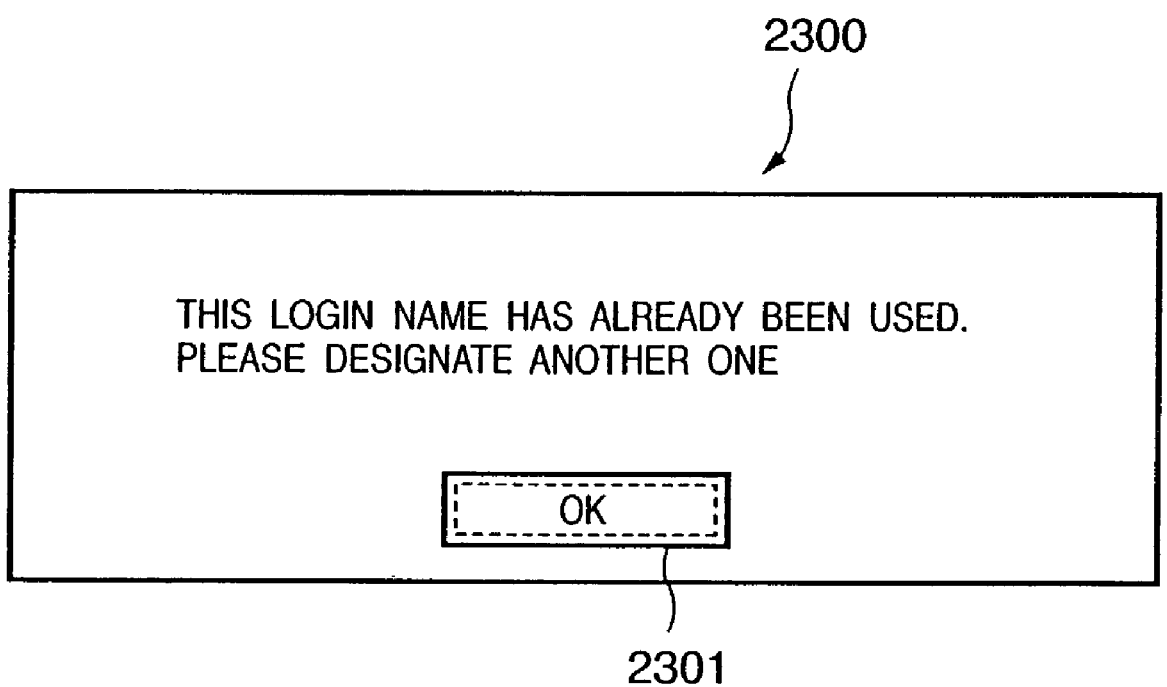
FIG. 13 is a view showing an example of the error window transmitted from the photosite server when the login name input by a user has already been registered in the user registration processing in FIG. 10.
Figure 14:
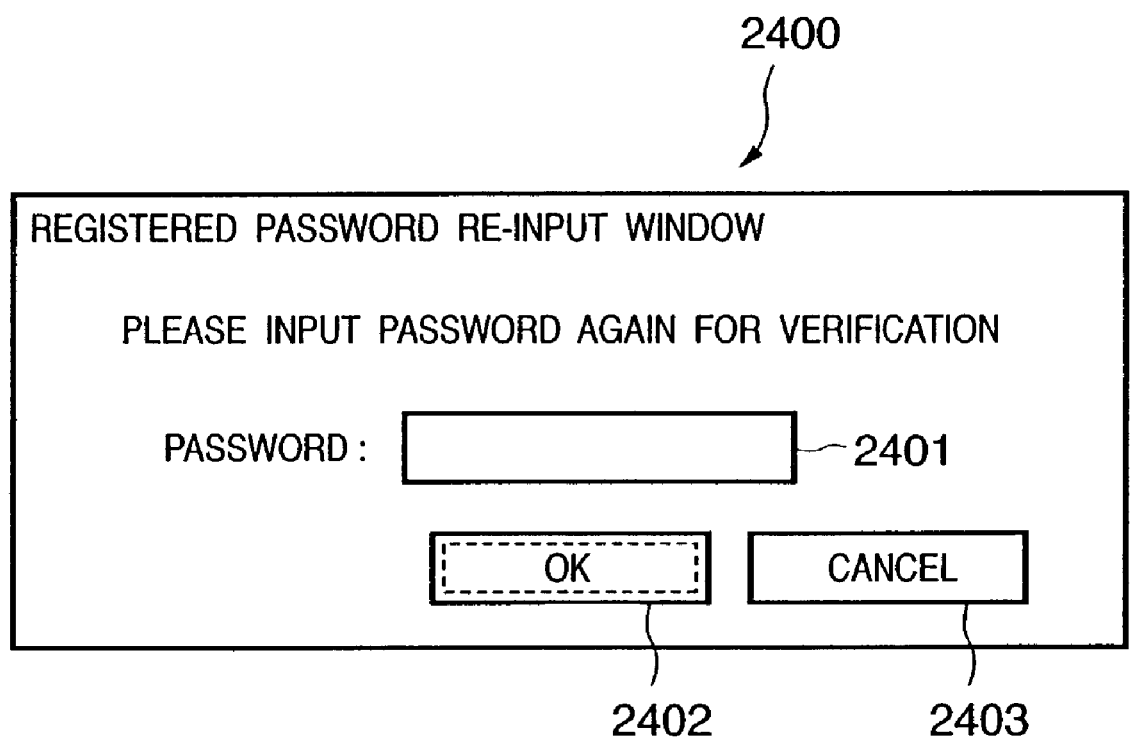
FIG. 14 is a view showing an example of the error window transmitted from the photosite server when the user is prompted to input a password again in the user registration processing in FIG. 10.

If the login name input in the login name input area 2102 has already been used, the data of an error window is transmitted in step S2006. FIG. 13 shows an example of an error window 2300 displayed on the basis of this error window data. If an OK button 2301 on the error window 2300 is pressed, the flow returns to step S2001 to transmit the display data of the user registration window 2100 again.

If the login name input in the login name input area 2102 is not found in the database 118, the data of a window for prompting the user to input a password again (e.g., a window 2400 shown in FIG. 14) (step S2007). If a cancel button 2403 on the password re-input window 2400 is pressed, the registration processing is interrupted, and the flow returns to step S2001 to transmit the display data of the user registration window 2100 again, although not shown in FIG. 10.

If an OK button 2402 on the password re-input window 2400 is pressed, it is checked whether the password input in a password input area 2401 on the window 2400 matches the password input in the password input area 2103 (step S2008).

If it is determined that the re-input password differs from the initially set password, the data of an error window is transmitted in step S2009. FIG. 15 shows an example of an error window 2500 displayed on the basis of this error window data. If an OK button 2501 on the error window 2500 is pressed, the flow returns to step S2007 to transmit the display data of the password re-input window 2400 again.

If it is determined that the re-input password matches the initially set password, for example, the display data of a user information confirmation window 2600 in FIG. 16 is transmitted (step S2010). The information displayed on the user information confirmation window 2600 is the information input by the user on the user registration window 2100. If a correction button 2602 is pressed, the flow returns to step S2001 to transmit the display data of the user registration window 2100 (and the data that have already been input) (step S2011).

If a confirmation button 2601 on the user information confirmation window 2600 is pressed, the maximum value of the values of user IDs issued from the database 118 in the past is acquired. The value obtained by adding 1 to the acquired value is the user ID of the user (step S2012).

In step S2013, one record is added to the user information data table 400, and the user ID obtained in step S2012 is registered in the user ID 401, and the pieces of input information are registered in the other corresponding items on the user registration window 2100.

The input areas on the user registration window 2100 correspond to the items in the user information data table 400 in such a manner that the pieces of information input in the input areas 2101 to 2115 on the user registration window 2100 are sequentially stored in the items 402 to 416 in the user information data table. In addition, 1 is stored in the user registration state 417.

As described above, a new record is also added to the customer state data table 500. The user ID obtained in step S2012 is stored in the user ID 501; 0, in the last display album ID; a numerical value (e.g., the number of bytes) representing the maximum storage capacity, in the maximum disc capacity 503; and 0, in the cumulative point 504.

When a user is newly registered, there are no album created by the user or uploaded image. When a user is newly registered, therefore, one each of record of the customer album data table 600 and album information data table 700 may be created and registered in the information database 118 in advance. In this case, the value obtained by adding one to the maximum value of the album IDs that have been issued so far by the information database 118 is set in the album ID 602; 1, in the display ordinal number 603; and the temporary album name ("my album" in this embodiment) created by the system, in the album name 702. In the remaining album information data tables, the initial values determined by the photosite server 105 are respectively set.

When registration of necessary records in the information database 118 is completed in step S2013, e-mail having the same contents as those displayed on the user information confirmation window 2600 is created and transmitted to the address registered in the destination e-mail address 402 in the customer information data table 400 (step S2014). FIG. 17 shows an example of the e-mail transmitted in step S2014.

(Photosite Service Processing—User Authentication)

Processing for various services provided from the photosite server 105 to a given registered user will be described next with reference to FIGS. 9 and 18 to 31.

Figure 18:
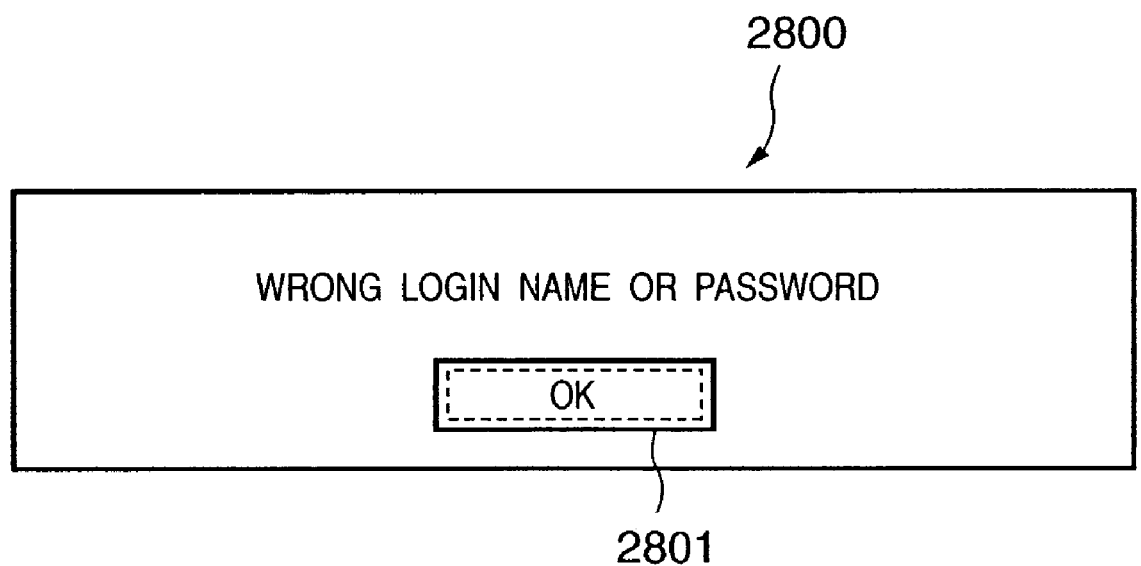
FIG. 18 is a view showing an example of the error window transmitted from the photosite server when the user fails to log in from the initial window in FIG. 9.

When the user inputs a login name and password in the login name input area 1902 and password input area 1903, respectively, and presses the login button 1904 on the login window 1900 in FIG. 9, the photosite server 105 searches the customer information data table 400 in the database 118 for a corresponding login name, and compares it with the password. Assume that no corresponding login name is found in the customer information data table 400 or that a corresponding login name is found, but the password registered in the customer information data table 400 differs from the password input in the password input area 1903 on the login window 1900. In this case, for example, the display data of a warning window 2800 shown in FIG. 18 is transmitted. If a button 2801 on the warning window 2800 is pressed, the display data of the login window 1900 is transmitted again.

As described above, assume that in this embodiment, all the images uploaded by users are managed on a folder (called an album) basis.

If a record containing both the login name and the password input on the login window 1900 is found n the customer information data table 400, it is determined that the registered user has done proper login, and the data of a service provision initial screen corresponding to the registered user is created from information such as the user ID and album ID and transmitted.

Figure 19:
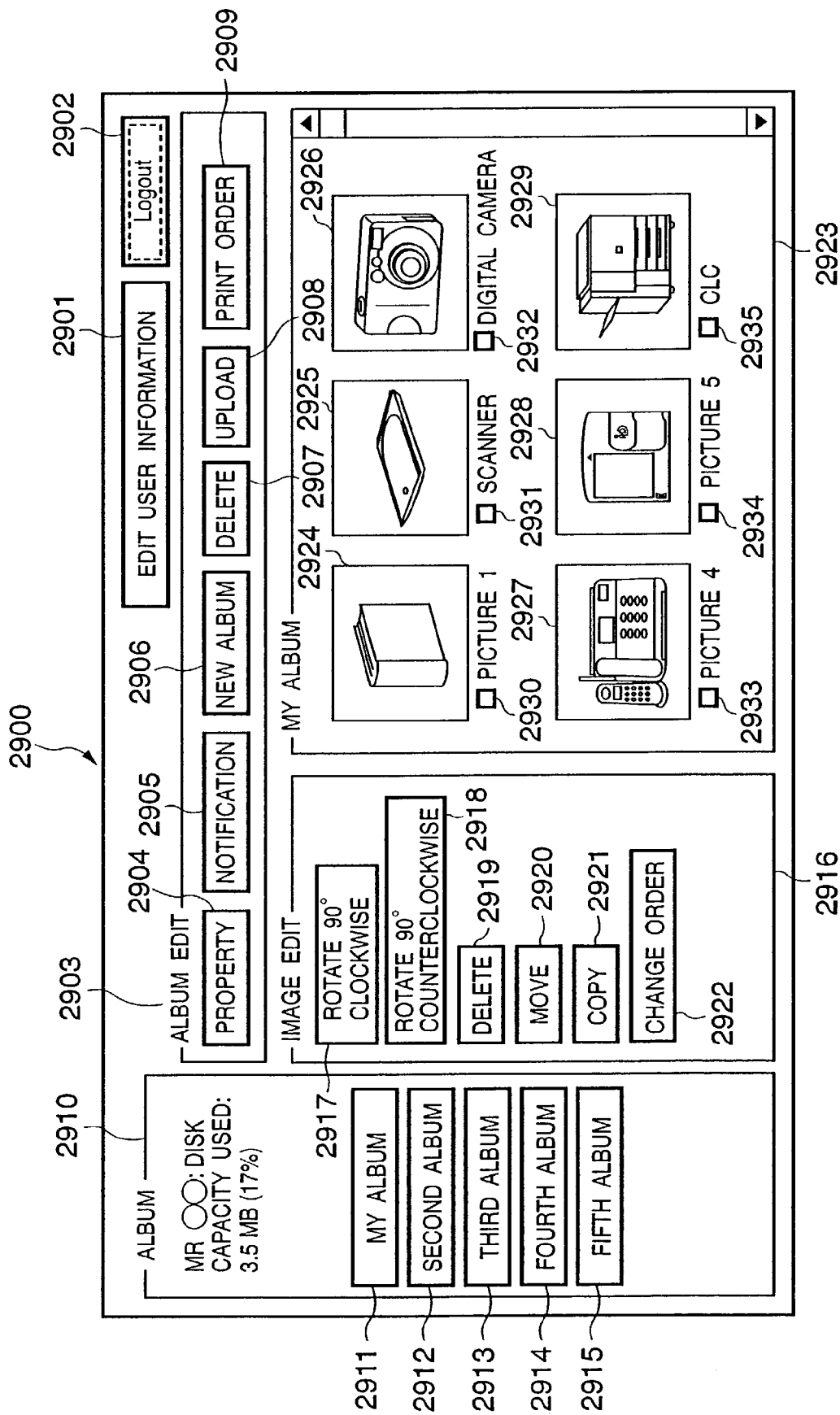
FIG. 19 is a view showing an example of the service provision initial window transmitted to a user PC when the user successfully logs in to the photosite server according to the embodiment of the present invention.

FIG. 19 shows an example of a service provision initial window 2900. On the window 2900, a button 2901 is a button for editing user information. A button 2902 is a logout button. Buttons for edit operation for the album displayed on this window are arranged in an area 2903. A button 2904 is a button for setting the properties of an album. A button 2905 is an album notification button. A button 2906 is a button for newly creating an album. A button 2907 is a button for deleting an album. A button 2908 is a button for uploading image data. A button 2909 is a print order button.

An area 2910 is an area in which buttons for album selection are displayed. On the upper portion of this area, the total data size of images data stored (uploaded) in the photosite server 105 is displayed, together with its ratio to the allowable capacity. Buttons equal in number to the albums created by the user are arranged below the upper portion. Referring to FIG. 19, buttons 2911 to 2915 indicate that five albums were created by the user. When a given one of the buttons 2911 to 2915 is pressed, the photosite server 105 displays the images uploaded in the album corresponding to the pressed button in an album display area 2923, and displays, on the upper left end of the album display area, the album name of the album whose images are being displayed (i.e., referring to FIG. 19, the images of "my album" are displayed in the album display area 2923). For images 2924 to 2929 displayed in the album display area 2923, corresponding check boxes 2930 to 2935 are arranged. When a displayed image itself is pressed, a property setting window for the image is displayed.

An area 2916 is an area in which buttons associated with edit processing for the respective images in an album are arranged. When a given one of buttons 2917 to 2922 is pressed, edit processing corresponding to the pressed button is performed for one of the images displayed in the album display area 2923 which corresponds the check box that is checked.

(Photosite Service Processing—Outline of Processing after Login)

Figure 20:
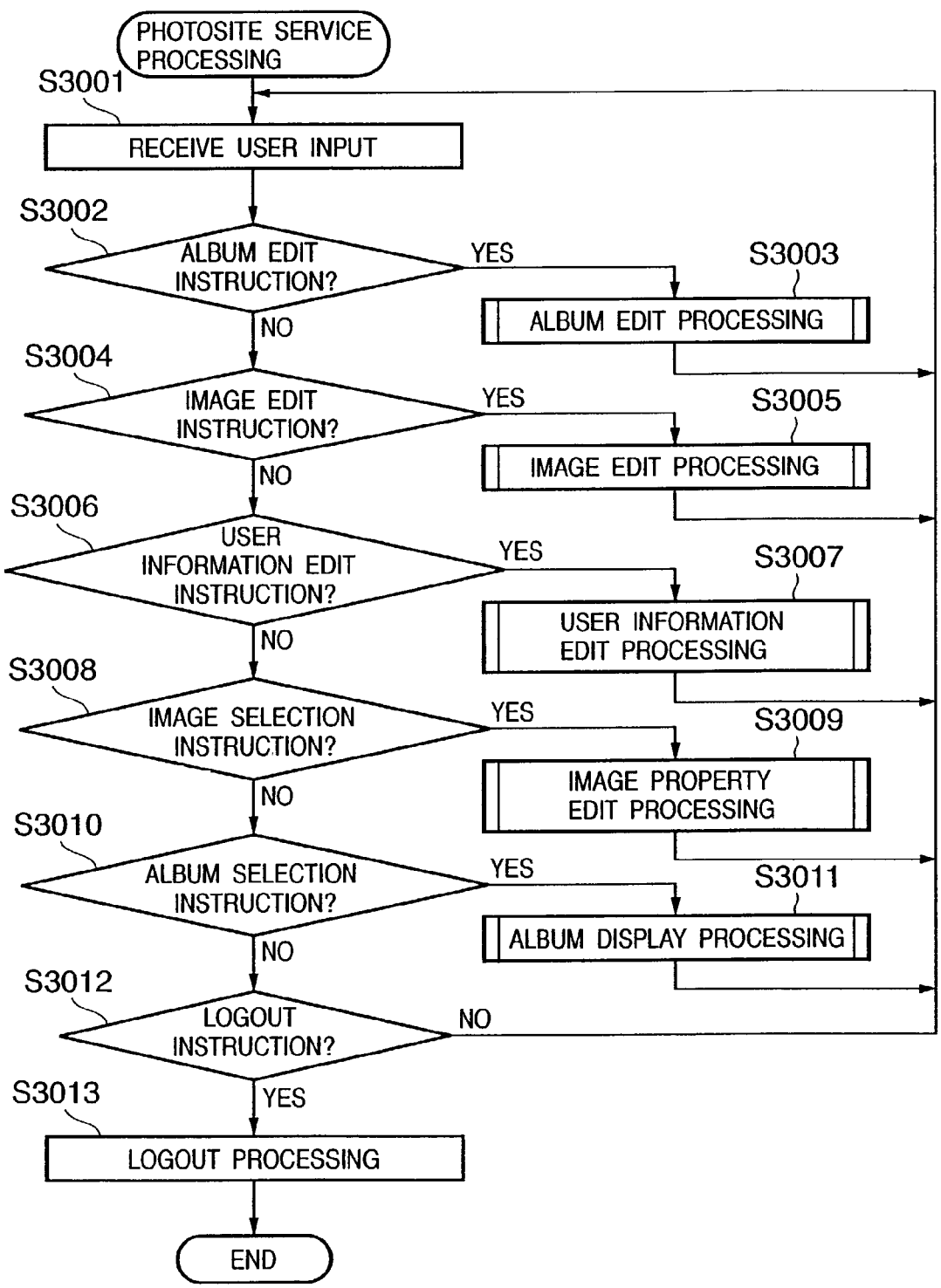
FIG. 20 is a flow chart for explaining an outline of photosite server processing with respect to user operation on the service provision initial window shown in FIG. 19.

FIG. 20 is a flow chart showing an outline of the processing to be performed by the photosite server 105 in accordance with user's operation on the service provision initial window 2900 shown in FIG. 19 after the login processing by the registered user.

First of all, in step S3001, the CPU waits for some input from the user (operation on the service provision initial window 2900). If input operation is done, it is checked in step S3002 whether the user input is an instruction to perform album edit processing, i.e., one of the buttons 2904 to 2909 included in the album edit area 2903 is pressed. If one of the buttons in the area 2903 is pressed, the flow advances to the album edit processing in step S3003.

If it is determined in step S3002 that the user input is not an instruction to perform album edit processing, it is checked in step S3004 whether the input is an instruction to perform image edit processing. When one of the buttons 2917 to 2922 in the area 2916 on the service provision initial window 2900 is pressed, it is determined that the input is an instruction to perform image edit processing, the flow then advances to the image edit processing in step S3005.

If it is determined in step S3004 that the user input is not an instruction to perform image edit processing, it is checked in step S3006 whether the input is an instruction to perform edit processing for user information. That is, it is checked whether the button 2901 on the service provision initial window 2900 is pressed. If it is determined that the button 2901 is pressed, the data on the user registration window 2100 shown in FIG. 11 and the user information that has already been registered are transmitted in step S3007. The user can change the registered information by changing the contents of a desired item on the user registration window 2100 and pressing the registration button 2116.

If it is determined in step S3006 that the user input is not an instruction to perform edit processing for user information, it is checked in step S3008 whether the input is an image selection instruction, i.e., one of the images displayed in the album display area 2923 is pressed. If it is determined that an image is selected, the flow advances to the image property edit processing in step S3009.

If it is determined in step S3008 that the user input is not an image selection instruction, it is checked in step S3010 whether the user input is an album selection instruction, i.e., one of the buttons 2911 to 2915 in the area 2910 on the service provision initial window 2900 is pressed. If it is determined that one of these buttons is pressed, it is determined that album selection is performed, and the album display processing in step S3011 is performed. The album display processing will be described later.

If it is determined in step S3010 that the user input is not an album selection instruction, it is checked in step S3012 whether the user input an logout instruction. If the button 2902 on the service provision initial window 2900 is pressed, it is determined that the user input is a logout instruction, and the flow advances to step S3013.

If it is determined in step S3012 that the user input is not a logout instruction, the flow returns to step S3001 to wait for the next user input.

In step S3013, logout processing is performed. When logout processing is performed, the photosite server 105 updates the data of the last display album ID 502 of the customer state data table 500 in the memory 118 by registering the currently displayed album ID. Thereafter, the photosite server 105 transmits the display data of the initial window 1900.

Step S3003 (album edit processing) and step S3011 (album selection/display processing) in FIG. 20 will be described in detail below. However, a detailed description of step S3005 (image edit processing) and step S3009 (image property edit processing) which are not directly relevant to the present invention will be omitted. In addition, step S3007 (user information edit processing) is also the same as that described in the description of user registration processing, and hence a detailed description thereof will be omitted. Note, however, that the user information edit processing differs from that at the time of user registration in that the information registered by the user is displayed as initial values when a window is displayed, the service provision initial window 2900 is displayed when the cancel button 2117 is pressed, and registration of user information in the information database 118 amounts to the updating of existing user information instead of the registration of new information.

(Photosite Service Processing—Album Edit Processing)

Figure 21:
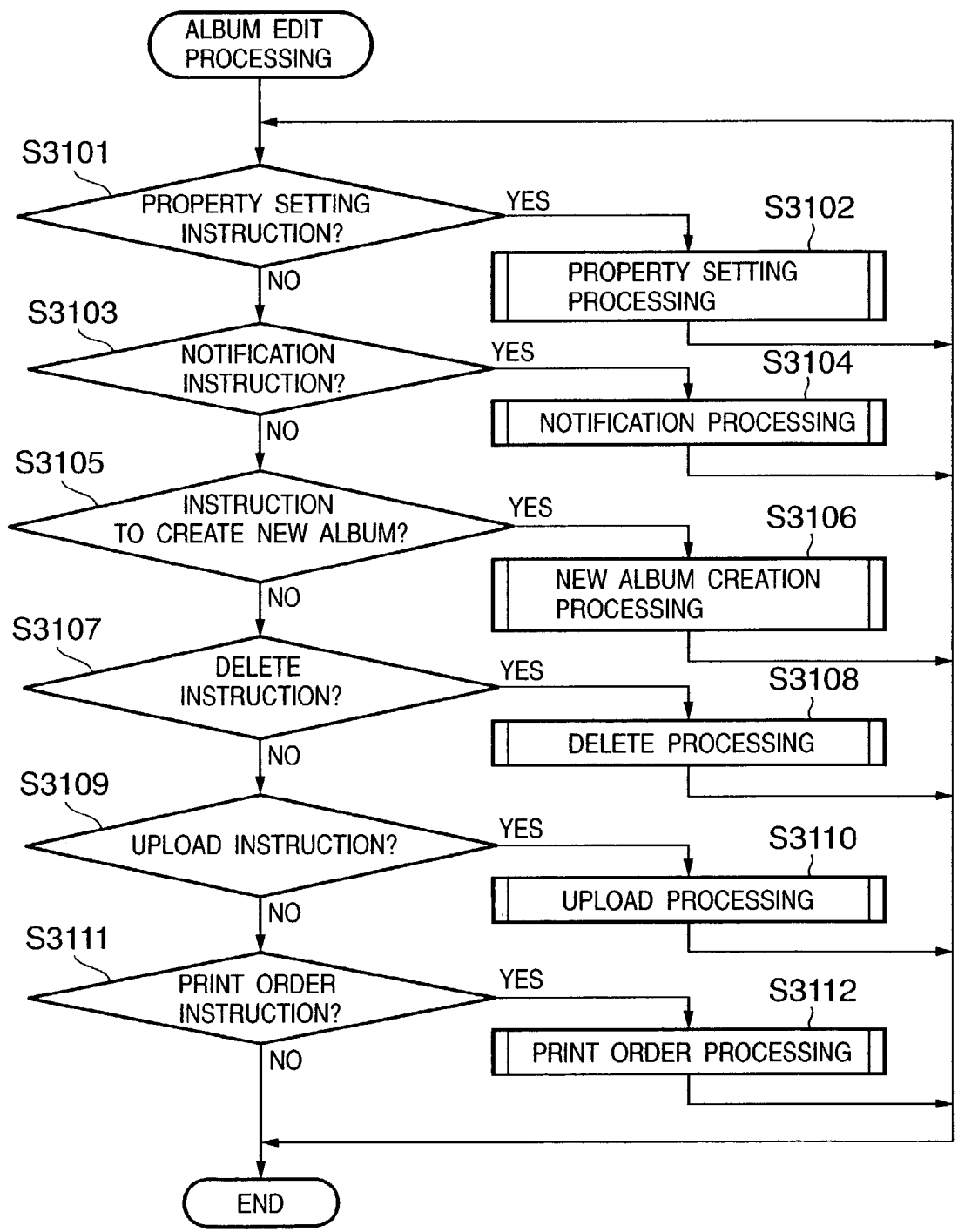
FIG. 21 is a flow chart for explaining photosite server processing with respect to user operation for an album edit area on the service provision initial window shown in FIG. 19.
Figure 22:
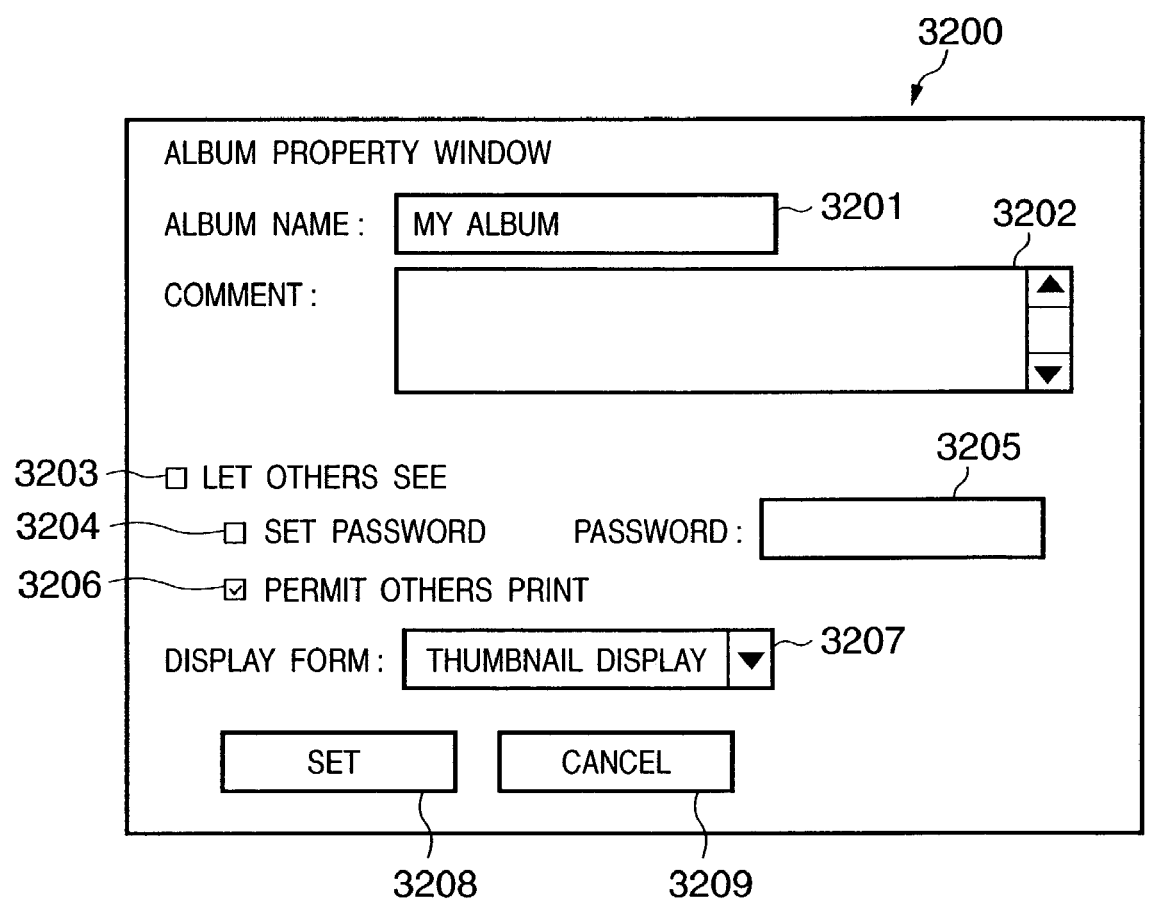
FIG. 22 is a view showing an example of the window transmitted from the photosite server when album property setting processing is performed in the album edit processing in FIG. 21.

FIG. 21 is a flow chart showing a procedure for album edit processing performed by the photosite server 105.

First of all, it is checked in step S3101 whether property setting is designated, i.e., the button 2904 is pressed. If the button 2904 is pressed, the flow advances to step S3102 to transmit, for example, the data of a property edit window 3200 in FIG. 22. The user can set various attributes associated with the currently displayed/edited album by using the property edit window 3200, and a detailed description thereof will be omitted.

If it is determined in step S3101 that the input is not a property setting instruction, it is checked in step S3103 whether the input is an album notification instruction, i.e., the button 2905 is pressed. If the button 2905 is pressed, the flow advances to step S3104 to transmit, for example, the display data of an album notification window 3300 shown in FIG. 23. The user can make settings by using the album notification window 3300 to notify the desired third party of a method of browsing the currently displayed/edited album by e-mail. A detail of this processing will be described later.

If it is determined in step S3103 that the input is not an album notification instruction, it is checked in step S3105 whether the input is an instruction to newly create an album, i.e., the button 2906 is pressed. If the button 2906 is pressed, the flow advances to step S3106 to transmit the data of the property edit window 3200 shown in FIG. 22. The user can setting the properties of an album to be newly created by using the property edit window 3200. After the properties are set, a new album is created. A detailed description of this processing will be omitted.

If it is determined in step S3105 that the input is not an instruction to newly create an album, it is checked in step S3107 whether an album delete instruction, i.e., the button 2907 is pressed. If the button 2907 is pressed, the flow advances to step S3108 to transmit, for example, the data of an album delete window 3400 shown in FIG. 24. The user can delete the currently displayed/edited album by pressing the delete button 3401 on the album delete window 3400. A detailed description of album delete processing will be omitted.

If it is determined in step S3107 that the input is not an album delete instruction, it is checked in step S3109 whether the input is an instruction to upload image data onto the currently displayed/edited album, i.e., the button 2908 is pressed. If the button 2908 is pressed, the flow advances to step S3110 to perform upload processing. This processing will be described in detail later.

If it is determined in step S3109 that the input is not an instruction to upload image data onto the album, it is checked in step S3111 whether the input is an album print order, i.e., the button 2909 is pressed. If the button 2909 is pressed, the flow advances to step S3112 to perform the above print order processing. A detailed description of this processing will be omitted.

(Photosite Service Processing—Album Selection/Display processing)

Figure 25:
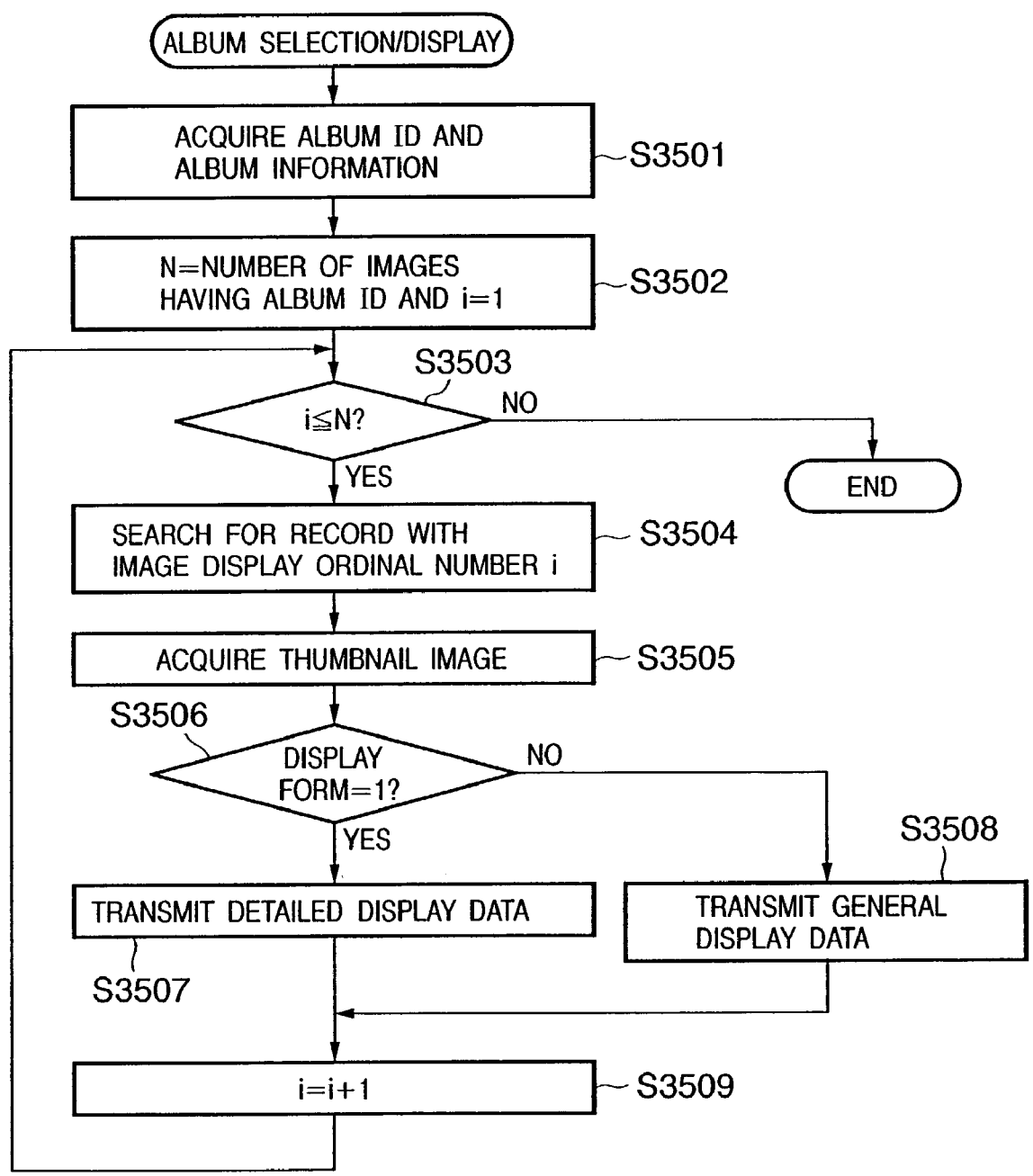
FIG. 25 is a flow chart for explaining the processing (album selection and display processing) to be done by the photosite server with respect to user operation of an album selection button on the service provision initial window shown in FIG. 19.

The processing in step S3011 in FIG. 20, i.e., the album selection/display processing to be performed by the photosite server 105 when one of the album selection buttons 2911 to 2915 in the album selection area 2901 in the service provision initial window 2900 is pressed, will be described next with reference to the flow chart of FIG. 25.

It is checked in step S3501 which ordinal number the pressed button has with respect to the head of the group of buttons, i.e., which album display ordinal number corresponds to the pressed button, and the customer album data table 600 in the information database 118 is searched by using the user ID of the login user and the obtained album display ordinal number as keys. The corresponding record is obtained from the hits, i.e., the found records, by searching the album information data table 700 in the information database 118 using the album ID as a key.

The album image data table 800 in the information database 118 is searched by using the album ID acquired in step S3501 to search out all the records having this album ID in the album ID 801. The number of corresponding records is represented by N, and 1 is assigned to a process variable i for image counting (step S3502).

It is checked in step S3503 whether i≦N. The processing from step S3504 to step S3509 is repeated while i≦N, thus displaying the images within the album.

The data table acquired in the step S3502 is then searched to find a record having the same value as i in the image display number 803, and the image ID of the corresponding image is obtained. The image information data table 900 in the information database 118 is searched to find a record having the obtained image ID in the image ID 901 (step S3504).

A thumbnail image is then acquired from the image database 117 by using the thumbnail file path 905 of the corresponding record (step S3505).

It is checked in step S3506 whether the value of the display form number 709 in the album information data table 700 acquired in step S3501 is 1. As described above, in this embodiment, if this value is 0, it indicates thumbnail display. If the value is 1, it indicates detailed display.

Figure 26:
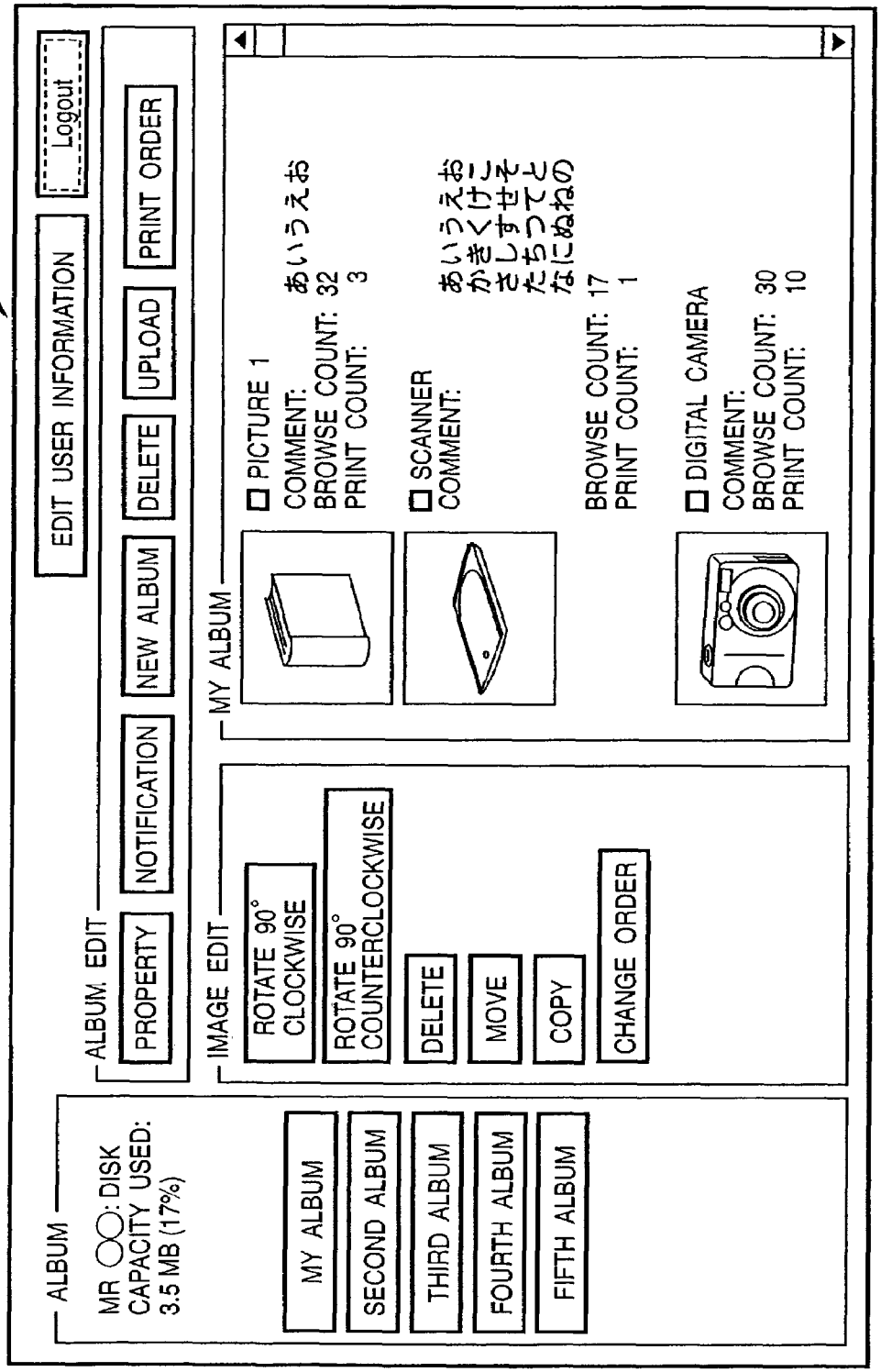
FIG. 26 is a view showing an example of the detailed display window transmitted from the photosite server in the album selection/display processing in FIG. 25.

If the value of the display form number 709 is 1, detailed display data is transmitted in step S3507. The detailed display data contains a thumbnail image, detailed information about the image, and image edit check boxes corresponding to the thumbnail image. In this embodiment, as the detailed information to be transmitted when detailed display is designated, the image name 903 from the image information data table 900, the comment acquired by using the comment file path 907, the image browse count 908, and the image print count 909 are used. FIG. 26 shows an example of an album display window 3600 when detailed display is performed. Since this window 3600 is the same as the service provision initial window 2900 except for the display method of the album display area 2923, a detailed description thereof will be omitted.

If it is determined in step S3506 that the display form number 709 is not 1, general thumbnail image display data for displaying thumbnail images, image names, and image edit check boxes is transmitted in step S3508. The service provision initial window 2900 in FIG. 19 is an example of the general thumbnail display window.

When the display data transmission in step S3507 or S3508 is completed, the variable i is incremented by one, and the flow returns to step S3503. If it is determined that i>N, since all the images in the album are displayed, the processing is terminated.

In this case, only the two display forms, i.e., detailed display and general display, are described. Obviously, however, three or more display forms may be used.

(Notification of Album)

Figure 23:
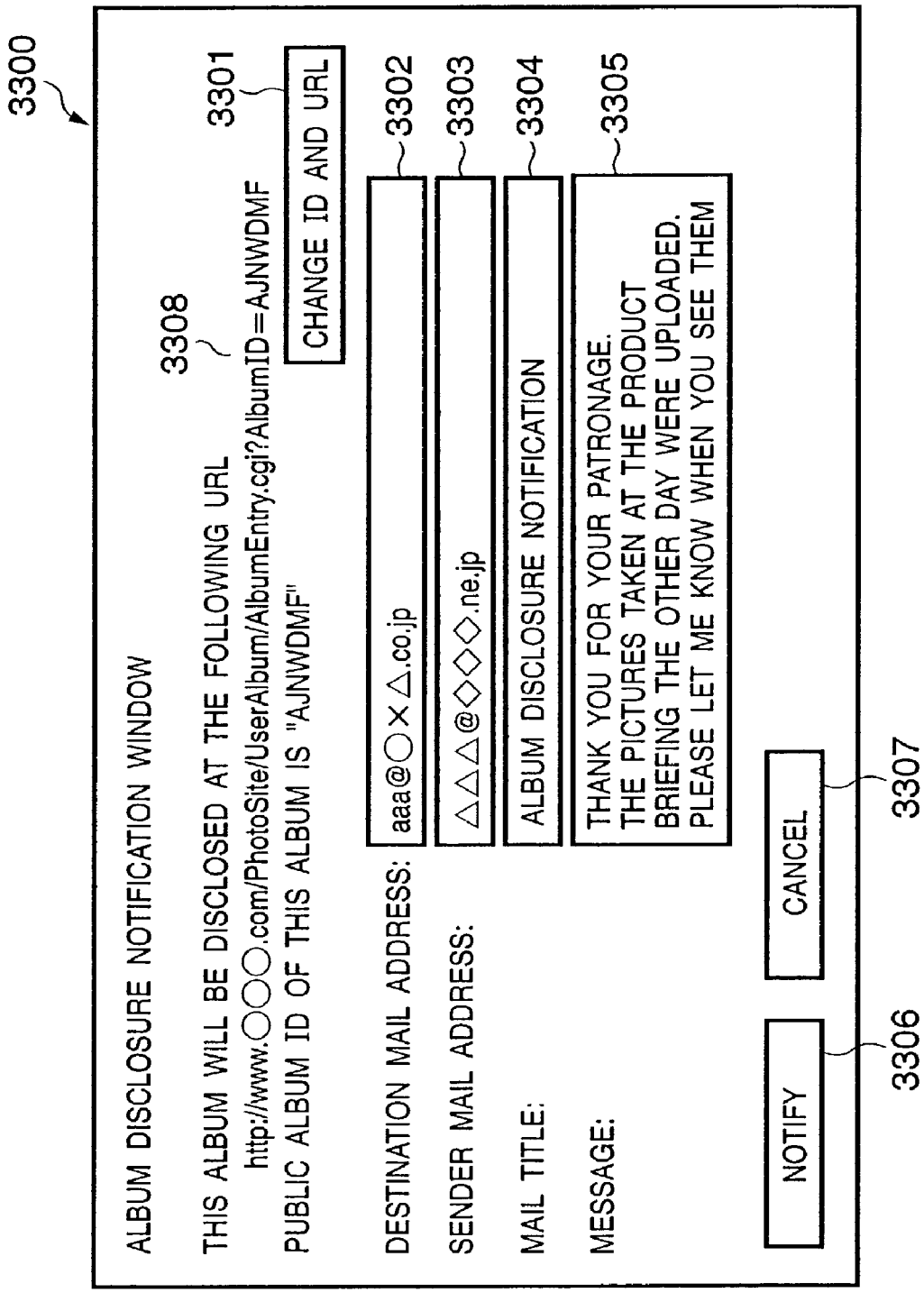
FIG. 23 is a view showing an example of the window transmitted from the photosite server when album disclosure notification processing is performed in the album edit processing in FIG. 21.
Figure 24:
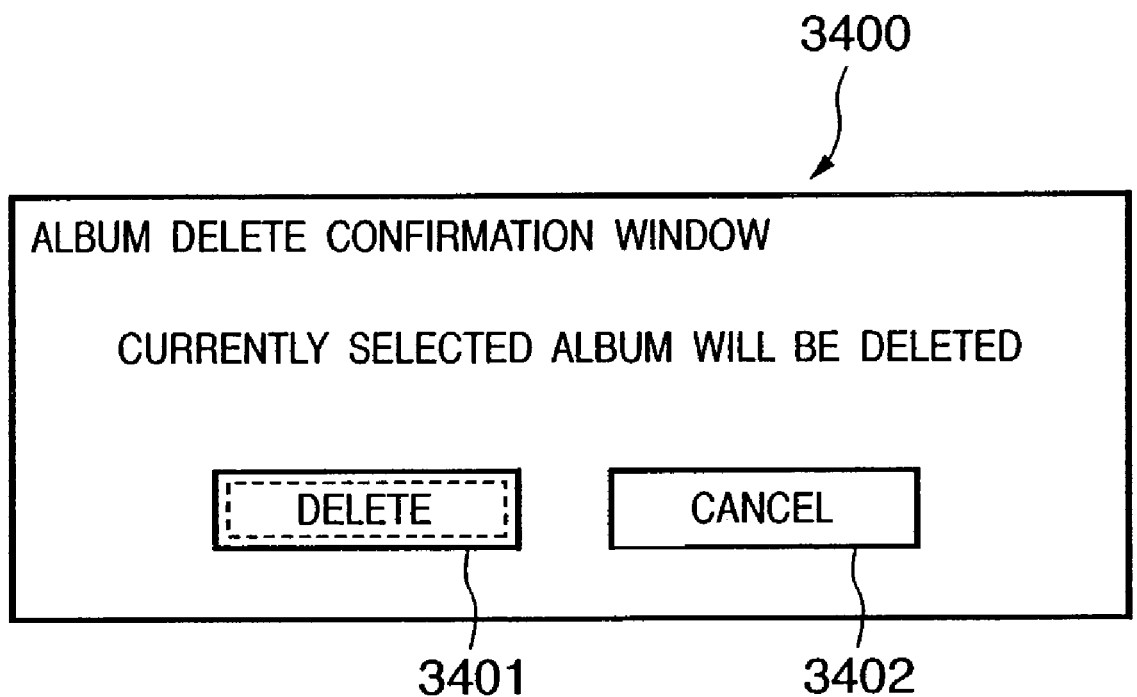
FIG. 24 is a view showing an example of the window transmitted from the photosite server when album delete processing is performed in the album edit processing in FIG. 21.

FIG. 23 is a view showing an example of the album disclosure notification window 3300 disclosed on the user PC on the basis of the display data transmitted from the photosite server 105 when the notification button 2905 on the service provision initial window 2900 is pressed.

The user presses the notification button 3306 after inputting the destination mail address 3302, sender mail address 3303, mail title 3304, and message 3305 on the disclosure notification window 3300. With this operation, the item data input on the disclosure notification window 3300 are notified to the photosite server 105. The photosite server 105 creates album notification mail by using the notified input contents, and transmits the mail to the destination mail address.

FIG. 27 shows an example of album notification mail. The URL and album ID contained in the notification mail have the same contents as those displayed in the URL/disclosure album ID display area 3308 on the disclosure notification window 3300. Upon reception of the mail notification, the browse user can browse images or an album by accessing the URL written in the mail. The user can browse the same contents as described above by inputting the album ID written in the notification mail into the album ID input area 1905 on the initial window 1900 and pressing the "GO!" button 1906. As shown in FIG. 23, the value ("AJNWDMF" in FIG. 23) of the parameter "AlbumID=" written at the end of the URL is equal to the album ID of the disclosure album.

Figure 38:
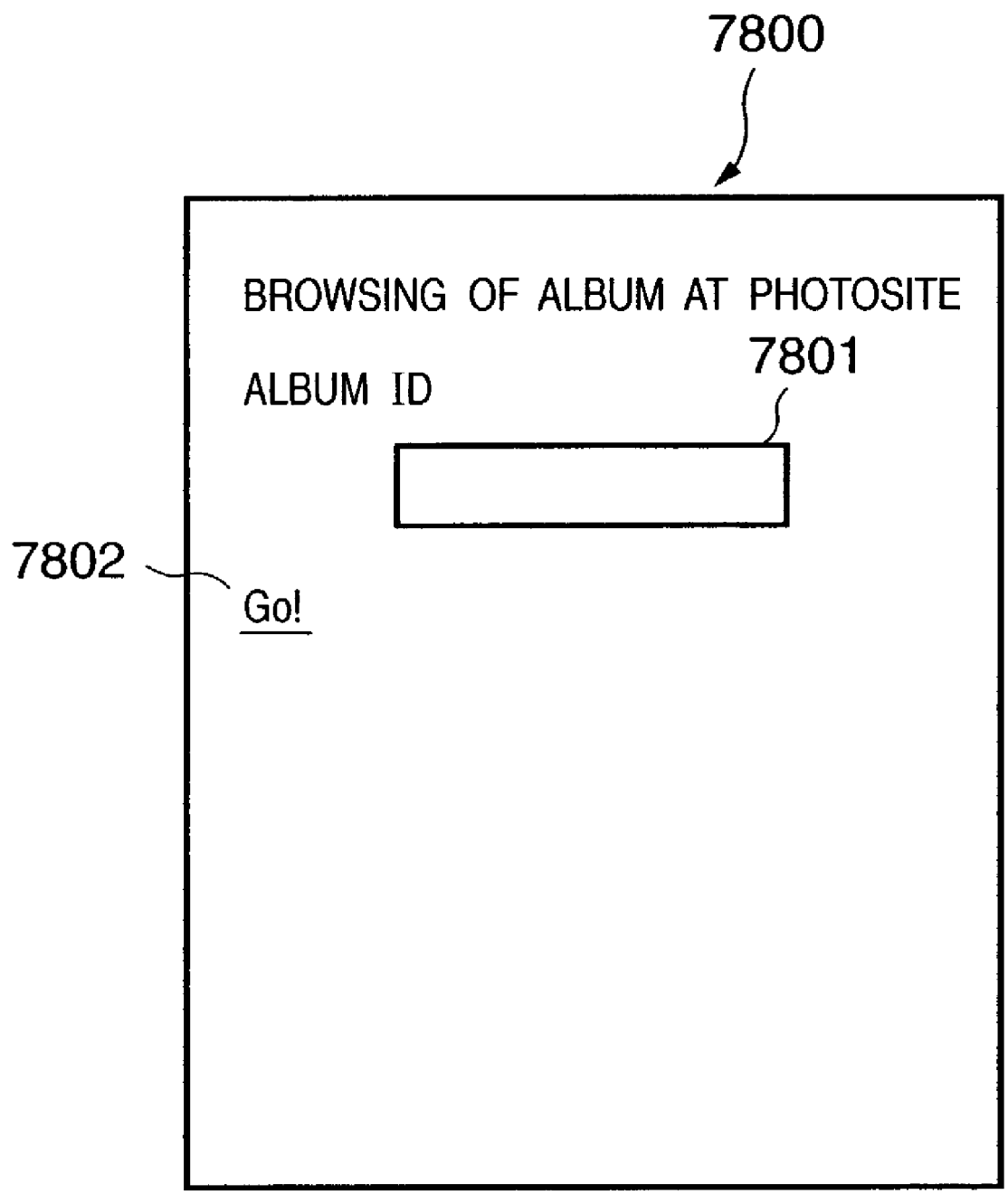
FIG. 38 is a view showing an example of the album browse start window transmitted from the photosite server according to the embodiment of the present invention to a portable browse user.

A window 7800 shown in FIG. 38 shows an example of a window used when the user accesses the photosite server 105 from a portable terminal having an Internet connection function to browse an album. The user inputs an album ID in an input area 7801 and selects/jumps to a link 7802 by using keys on the terminal, thereby browsing the corresponding album.

A procedure for creating the ID of an album to be disclosed will be described below. A disclosure album ID needs to have a value from which the third party cannot easily guess or infer the original album ID (the album ID 701 stored in the album information data table 700), the album ID of another album, and another disclosure album ID on the basis of the number/character string of the ID. For this purpose, the photosite server 105 encrypts the original album ID 701 as internal management information used to specify an album, and creates a disclosure album ID as a third party access code. In this embodiment, a check digit is added to the original album ID, and predetermined conversion that facilitates input operation is performed in consideration the convenience to a portable browse user, and the resultant data is used as a disclosure album ID.

Check digit addition processing for an album ID in the photosite server 105 according to this embodiment will be described first with reference to the flow chart of FIG. 28. In this embodiment, an original ID is multiplied by seven, and the value at each digit place of the product expressed in decimal is multiplied by the number of digits. The sum total of the products is then obtained, and a complement to the value of at the units place is set as a check digit. Each digital of the original ID is carried by one, and the check digit is added to the units place.

First of all, in step S6301, the album ID 701 of the album for which a notification indicating that the album is currently disclosed is to be made is obtained from the album information data table 700. The obtained value is multiplied by seven, and the resultant value is assigned to a variable ID.

In step S6302, the value of the variable ID is assigned to a process variable Div in which the quotient obtained by sequentially dividing the variable ID by 10 is stored; 1, to a process variable Order for counting the number of digits of the variable ID; 0, to a process variable Rem in which the quotient obtained by sequentially dividing the variable ID by 10 is stored; and 0, to a process variable Check for check digit calculation, thereby initializing the respective variables.

It is checked in step S6303 whether Div is 0. A sum total Check of the products of the numerical values at the respective digit places of an album ID and the number of digits is calculated by repeating the processing in steps S6304 and S6305 until Div becomes 0.

In step S6304, the reminder (Div mod 10) obtained by dividing Div by 10 is assigned to the variable Rem, the quotient (integer) obtained by dividing Div by 10 is assigned to Div, and Rem×Order is added to Check.

In step S6305, 1 is added to Order.

If it is determined that Div is 0, the quotient (Check mod 10) obtained by dividing Check by 10 is subtracted from 10, and the resultant value is assigned to Check in step S6306.

In step S6307, the value obtained by multiplying the variable ID by 10 and adding Check to the product is set as a new ID.

The numerical values before and after the ID obtained in this manner do not become album IDs. Even if a given person tries to search for other albums by manipulating the acquired disclosure album ID, the photosite server 105 can detect such unauthorized access and reject album display.

Figure 28:
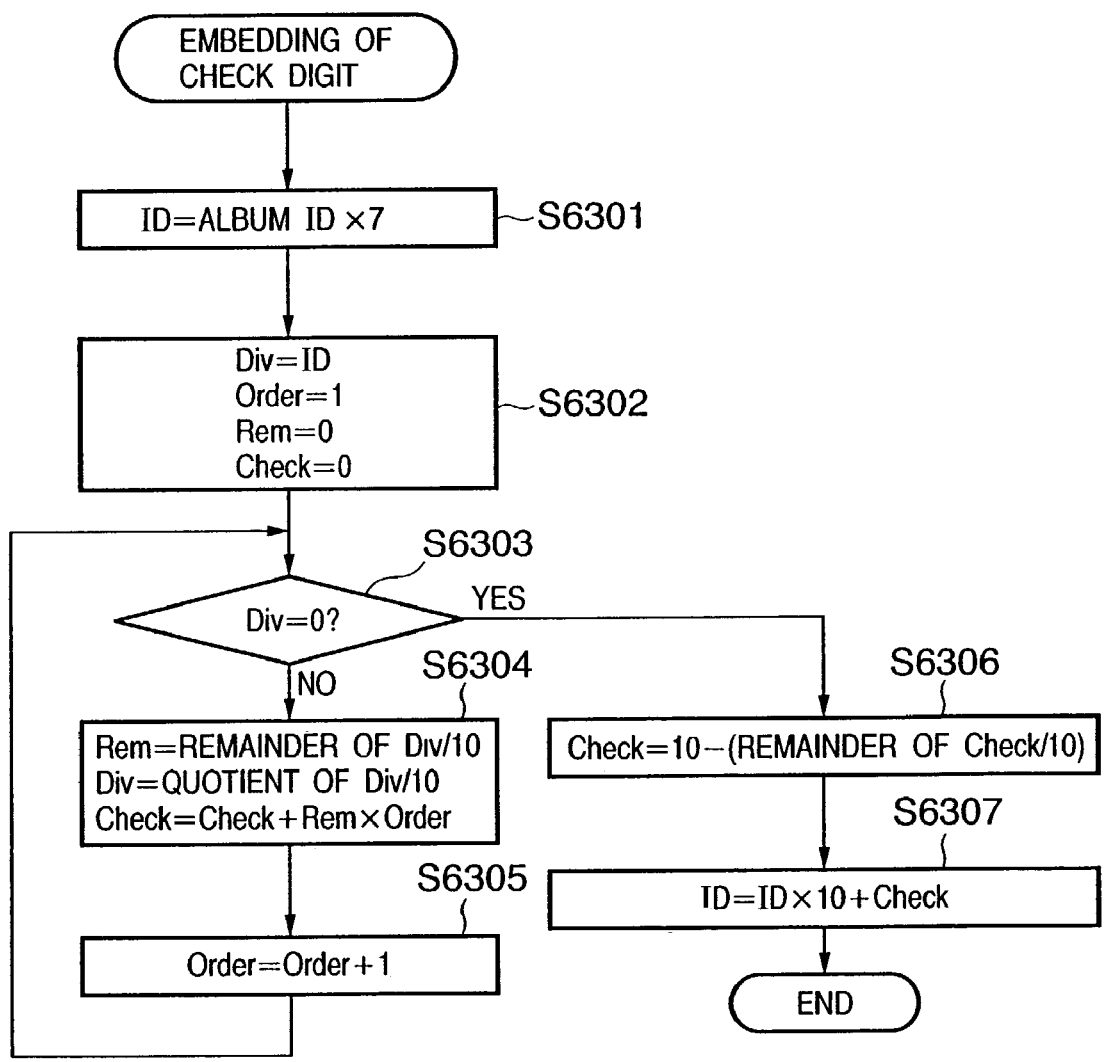
FIG. 28 is a flow chart for explaining the processing of adding a check digit to an album ID in the photosite server according to the embodiment of the present invention.

As described above, in this embodiment, in consideration of convenience to a portable browse user, the ID to which the check digital is added, obtained by the processing shown in FIG. 28, is further converted into a character string that can be easily input through the portable terminal, thereby creating a final disclosure album ID. However, the effect of creating an ID from which the original ID and other album IDs cannot be inferred is already achieved by an ID to which a check digit is added, and hence conversion processing to be done inconsideration of convenience in input operation from a portable terminal is not necessarily required.

The processing of converting an ID to which a check digit is added into a character string that can be easily input through a portable terminal will be described next with reference to the list and flow chart respectively shown in FIGS. 29 and 30. In this embodiment, an ID in a numerical form to which a check digit is added is converted into a letter string such that when characters are input by using numerical keys of a portable terminal, the characters input by using the same numerical key do not become consecutive.

The data managed in the portable terminal button/alphabet list 6400 shown in FIG. 29 include the buttons (Button) of the portable terminal, character codes (Letters) corresponding to the buttons (which can be input by using the buttons), and the numbers (AL) of character codes corresponding to the respective buttons. The number AL of character codes corresponding to a button X (X=1 to 9) is represented by AL[X]. In the case shown in FIG. 29, AL[2]=3 and AL[9]=4. In addition, a character string representing characters that can be input by button numbers (Button) are represented by Letters[Button]. In the list shown in FIG. 29, Letters[2]="ABC".

Figure 30:
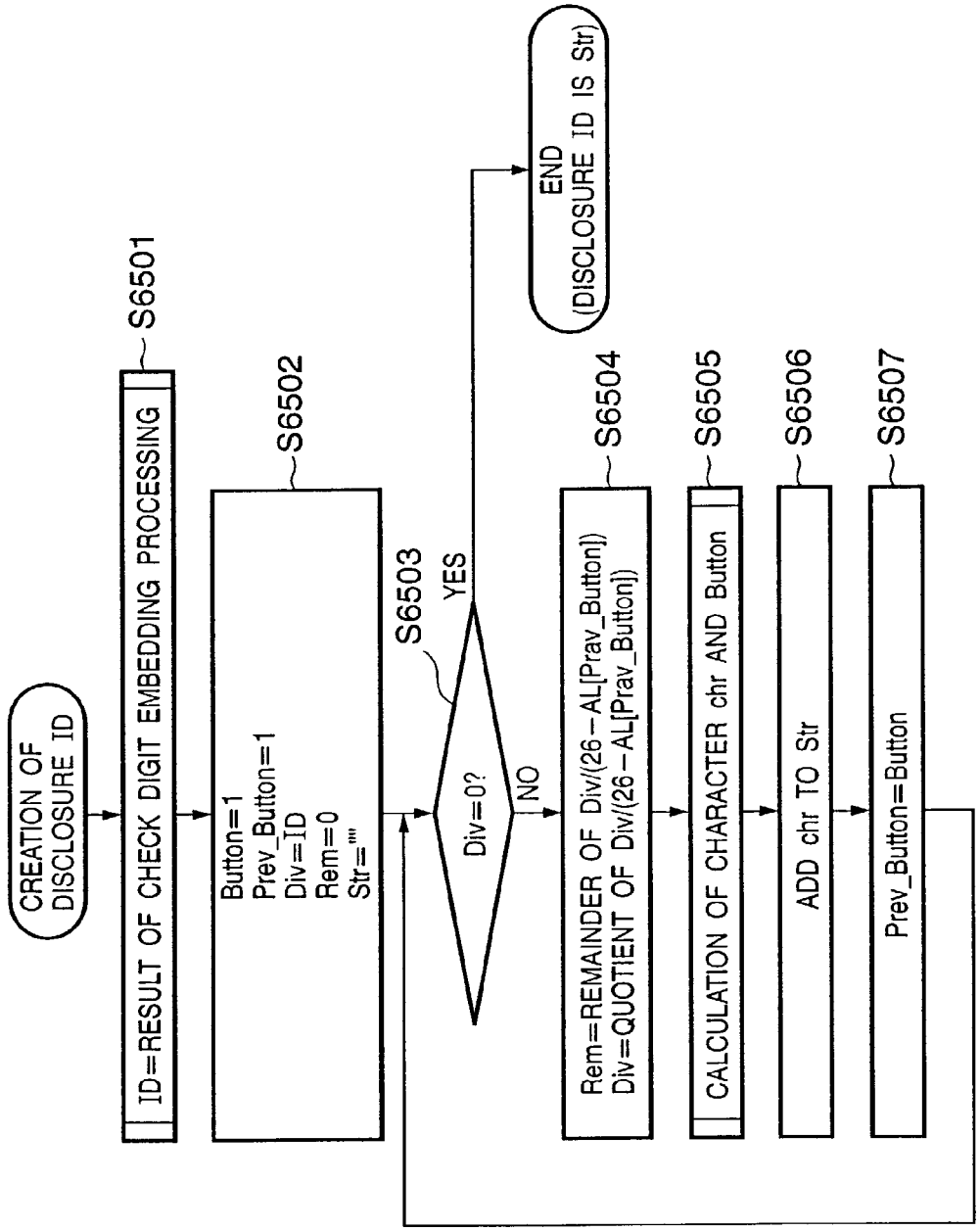
FIG. 30 is a flow chart showing the processing of creating a disclosure album ID by using the album ID created by the processing in FIG. 28 in the photosite server according to the embodiment of the present invention.

FIG. 30 is a flow chart showing the processing in the photosite server 105 according to which embodiment which is performed to convert an ID to which a check digit is added into a letter string without no consecutive characters corresponding to the same button on a portable terminal. In this embodiment, a base-26 number with A to Z assigned to 0 to 25 will be considered first. When a given character is used, a base-23 or base-22 number is created by using an alphabet from which the character input by the same button for the given character is omitted, with A being set as a 0 starting point (if the preceding character is A, B, or C, D is used as a starting point).

In step S6501, an album ID to which a check digit is added is set in the variable ID. This processing has been described with reference to FIG. 28.

In step S6502, 1 is set as an initial value in a process variable Button indicating the currently pressed button; 1, in a process variable Prev_Button indicating the immediately preceding button that was pressed; ID, in the process variable Div representing the quotient obtained by dividing the value of the ID by the number (integer) of types of characters that can be used; 0, in the process variable Rem representing the remainder; and a null character string, in a variable Str in which a character string as a conversion result is stored.

It is checked in step S6503 whether Div is 0. Characters are added one by one to the character string Str by repeating the processing from step S6504 to step S6507 until Div becomes 0.

In step S6504, the value of Div is divided by the number (integer) of characters (26−AL[Prev_Button]) that can be currently used, and the quotient and remainder are respectively set in Div and Rem. In the initial state, since Prev_Button is 1 and 0 is set as the value of AL[1] in FIG. 29, 26 types of characters can be used. Thereafter, 22 or 23 types of characters can be used in accordance with the value of Prev_Button.

In step S6505, the character chr calculated from the remainder and a button number Button to which chr belongs are calculated on the basis of the values of Rem and Prev_Button. This processing will be described later.

In step S6506, chr is added to the variable Str (the character chr is added to the right end of a character string which is the value of the variable Str).

In step S6507, Button is set in Prev_Button, and the flow returns to step S6503.

If it is determined in step S6503 that Div becomes 0, the value of the variable Str at this point of time becomes a character string representing a disclosure album ID.

Figure 31:
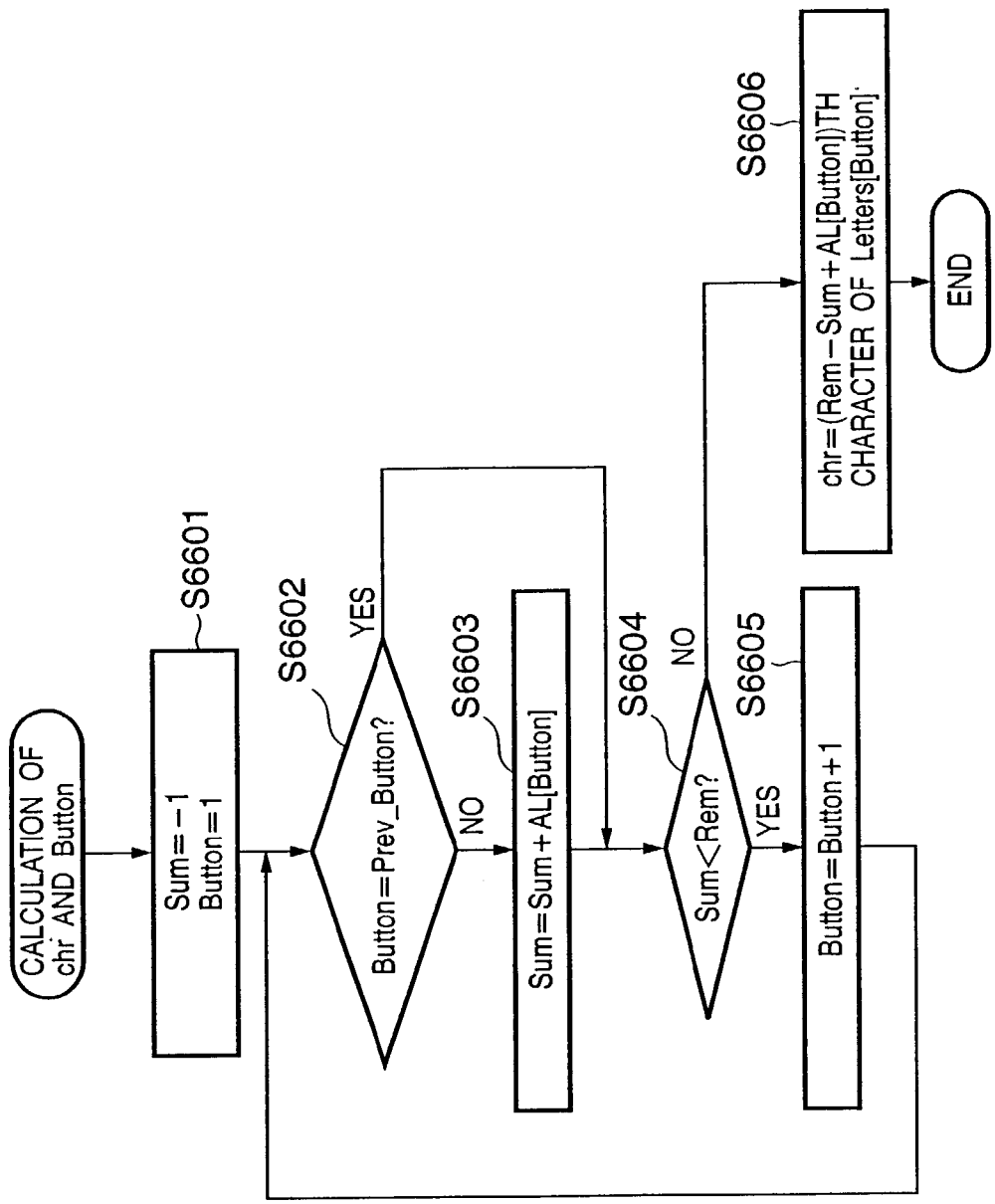
FIG. 31 is a flow chart for explaining processing in step S6505 in FIG. 30.

FIG. 31 is a flow chart showing the processing of obtaining the character chr corresponding to Rem and the button number Button to which the characters belong in step S6505 in FIG. 30.

First of all, in step S6601, a process variable Sum in which the number of character types AL[Button] that can be input by using one of the buttons on a portable terminal 113 is sequentially accumulated from button number 1 and the variable Button are initialized to −1 and 1, respectively.

In step S6602, it is checked whether the variable Button is equal to Prev_Button. If they are equal to each other, since the button corresponding to this number cannot be used, the flow advances to step S6604. If they are not equal, the type AL[Button] of character that can be input by using a button of a number corresponding to the variable Button is added to Sum in step S6603.

In step S6604, it is checked whether Sum<Rem. If Sum<Rem, 1 is added to the variable Button, and the flow returns to step S6602. If Rem≦Sum, since there is a character corresponding to Rem in the characters that can be input by buttons corresponding to the variable Button, the flow advances to step S6606.

In step S6606, chr is obtained. Note that chr is the (Rem−Sum+AL[Button])th character in Letters[Button].

(Browsing of Album)

When the browse user who has received the notification mail shown in FIG. 27 accesses a URL 6201 written in the notification mail, the photosite server 105 transmits, for example, the display data of an album browse start window 6700 shown in FIG. 32. Note that the display data of the album browse start window 6700 is also transmitted when the user inputs an album ID 6203 written in the notification mail into the album ID input area 1905 on the initial window 1900 and presses the "GO!" button 1906.

Figure 34:
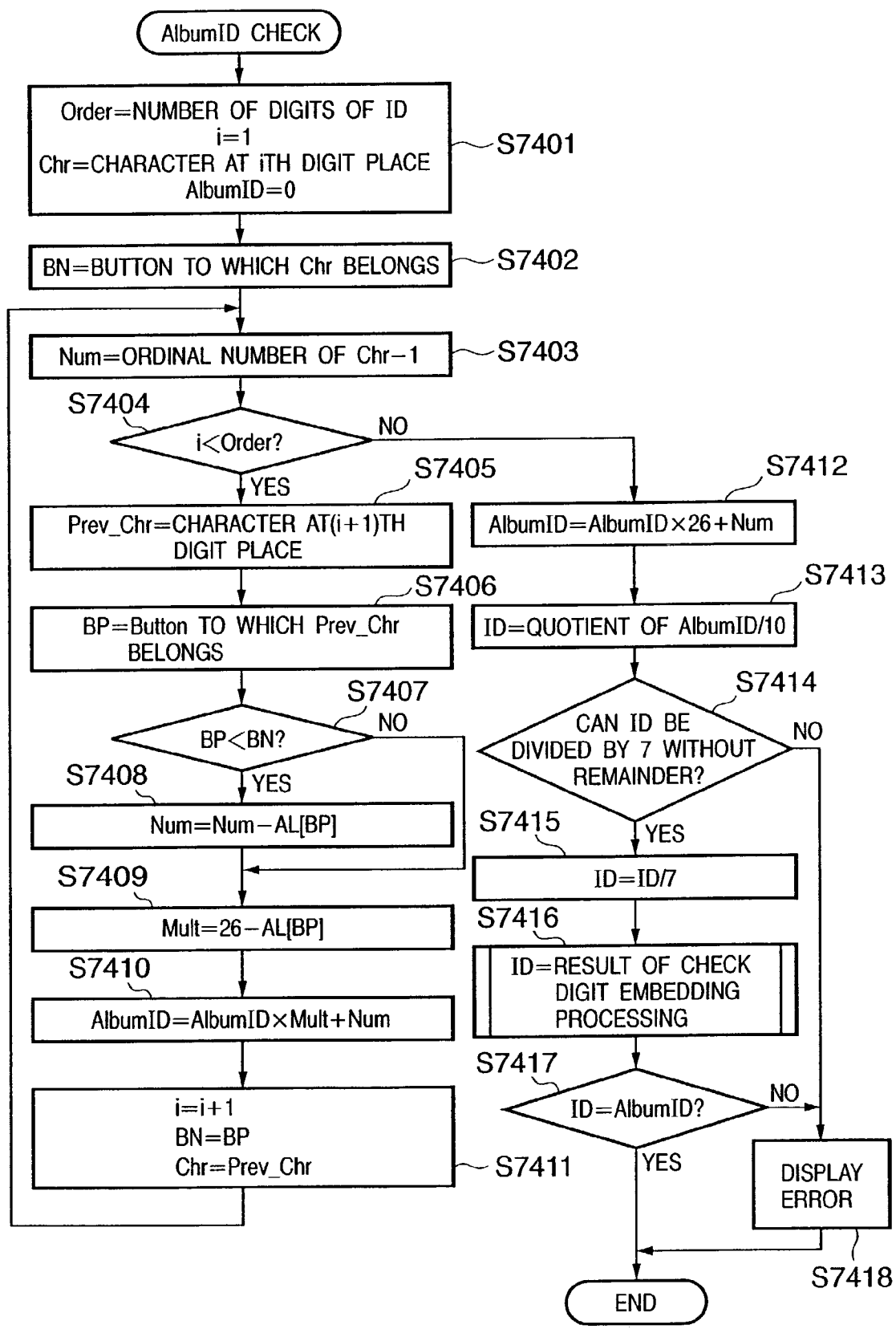
FIG. 34 is a flow chart showing the processing of checking the album ID input by a user when he/she browses an album in the photosite server according to the embodiment of the present invention.

FIG. 34 is a flow chart showing the processing of checking whether an album having the album ID designated on the album browse start window 6700 exists in the photosite server 105.

Figure 35:
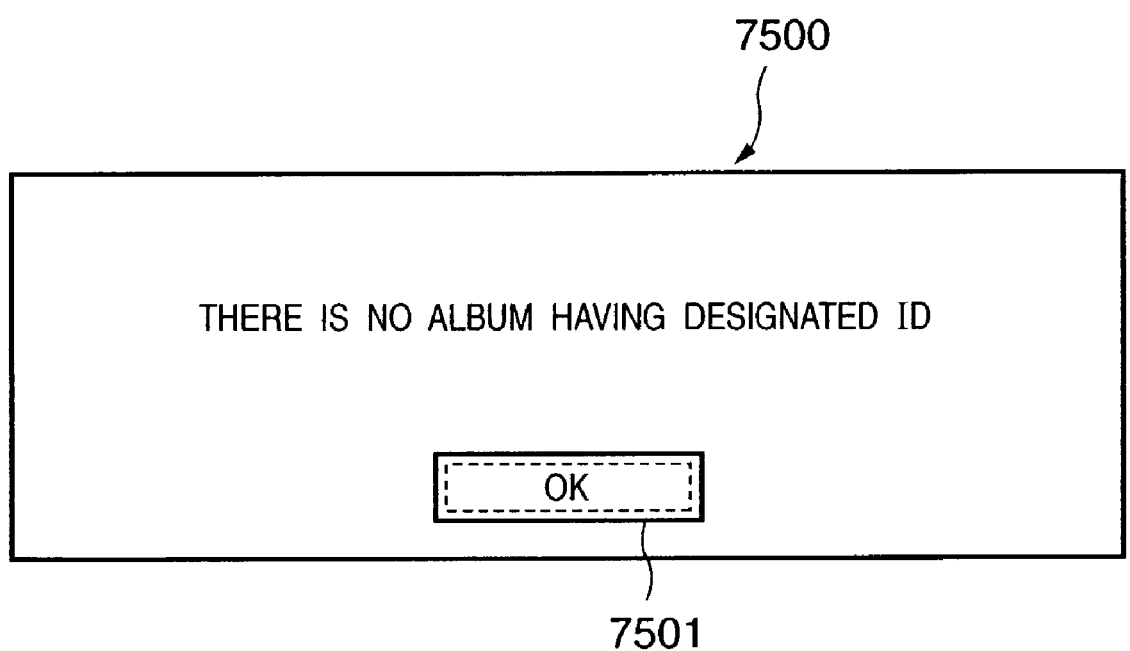
FIG. 35 is a view showing an example of the error window transmitted from the photosite server according to the embodiment of the present invention in the processing shown in FIG. 34.

First of all, in step S7401, the number of digits of the input ID is initialized to Order; the process variable i for counting the number of digits, to 1; the process variable Chr representing a character, to the character at the first digit place of the input album ID; and the album ID to be obtained, to 0. In this embodiment, input parameters representing an album ID are limited to English letters. If, however, unauthorized input, e.g., input of characters other than English letters, is checked, the display data of an error window is transmitted as in the case wherein there is no album with the designated album ID. FIG. 35 shows an example of an error window 7501.

In step S7402, the portable terminal button/alphabet list 6400 is searched for a button to which the character of the variable Chr is assigned, and the button number is set in a variable BN.

In step S7403, a specific ordinal number in the alphabet is obtained to which Chr corresponds is obtained, 1 is subtracted from the obtained value, and the resultant value is set in Num.

In step S7404, it is checked whether i<Order.

If it is determined in step S7404 that i<Order, the character at the (i+1)th digit place of the input album ID is set in a variable Prev_Chr.

In step S7406, the portable terminal button/alphabet list 6400 is searched for a button number to which the character of Prev_Chr is assigned, and the button number is set in the variable BP.

In step S7407, PB is compared with BN. As described above, in this embodiment, since an album ID is created such that two characters assigned to the same button are not consecutively input, if BP=BN, the display data of an error window 7500 shown in FIG. 35 is transmitted at once, and the processing is terminated.

If it is determined in step S7407 that BP<BN, only AL[BP] is subtracted from the value of Num in step S7408. If it is determined in step S7407 that BP>BN, the flow advances to step S7409 without performing the processing in step S7408.

In step S7409, (26−AL[BP]) is set in a process variable Mult representing a multiplier.

In step S7410, AlbumID is multiplied by Mult, and Num is added to the product. The resultant value is then set as new AlbumID.

In step S7411, 1 is added to i, and BP and Prev_Chr are respectively assigned to BN and Chr. The flow then returns to step S7403.

If it is determined in step S7404 that i is not larger than Order, the value obtained by multiplying AlbumID by 26 and adding Num to the product is newly set in AlbumID. If the album ID input by the user is a correct value, AlbumID obtained here becomes the ID obtained in FIG. 28.

As described above, since the ID obtained in FIG. 28 is the ID obtained by adding a check digit to the first digit place of the product of the value of the original album ID and 7, the processing of obtaining the original album ID is performed in step S7413 and the subsequent steps. First of all, in step S7413, the quotient obtained when AlbumID is divided by 10 is set in the variable ID, and it is checked in step S7414 whether this ID can be divided by 7 without a remainder.

If it is determined in step S7414 that ID is divided by 7 without a remainder, the quotient is set as an ID in step S7415.

In step S7416, the check digit addition processing shown in FIG. 28 is performed for the value obtained by dividing the ID by 7, and it is checked whether the resultant ID coincides with AlbumID (step S7417).

If it is determined in step S7414 that ID cannot be divided by 7 without a remainder, and it is determined in step S7417 that the ID to which the check digit is added does not coincide with AlbumID, it indicates that a proper album ID is not input. In step S7418, therefore, the display data of the error window 7500 shown in FIG. 35 is transmitted.

As described above, the photosite server 105 analyzes AlbumID of the parameter portion of an input URL or the album ID input to the album ID input area 1905, and searches the album information table 700 for a record having, in the album ID 701, the ID obtained in step S7415. The photosite server 105 then searches the customer album data table 600 for a user ID having the album ID, and further searches the customer information table for a record having the user ID in the user ID 401.

Subsequently, the display data of an album browse start window 6700 shown in FIG. 32 which includes the name (last name) 405 is transmitted. If the password permission/inhibition flag 705 of the album information data table 700 searched in this case indicates that a password is set for the album, a password input area 6701 is contained in the display data. Obviously, if no password is set for the album, the display data of the album browse start window 6700 which contains no password input area 6701 is transmitted.

Figure 33:
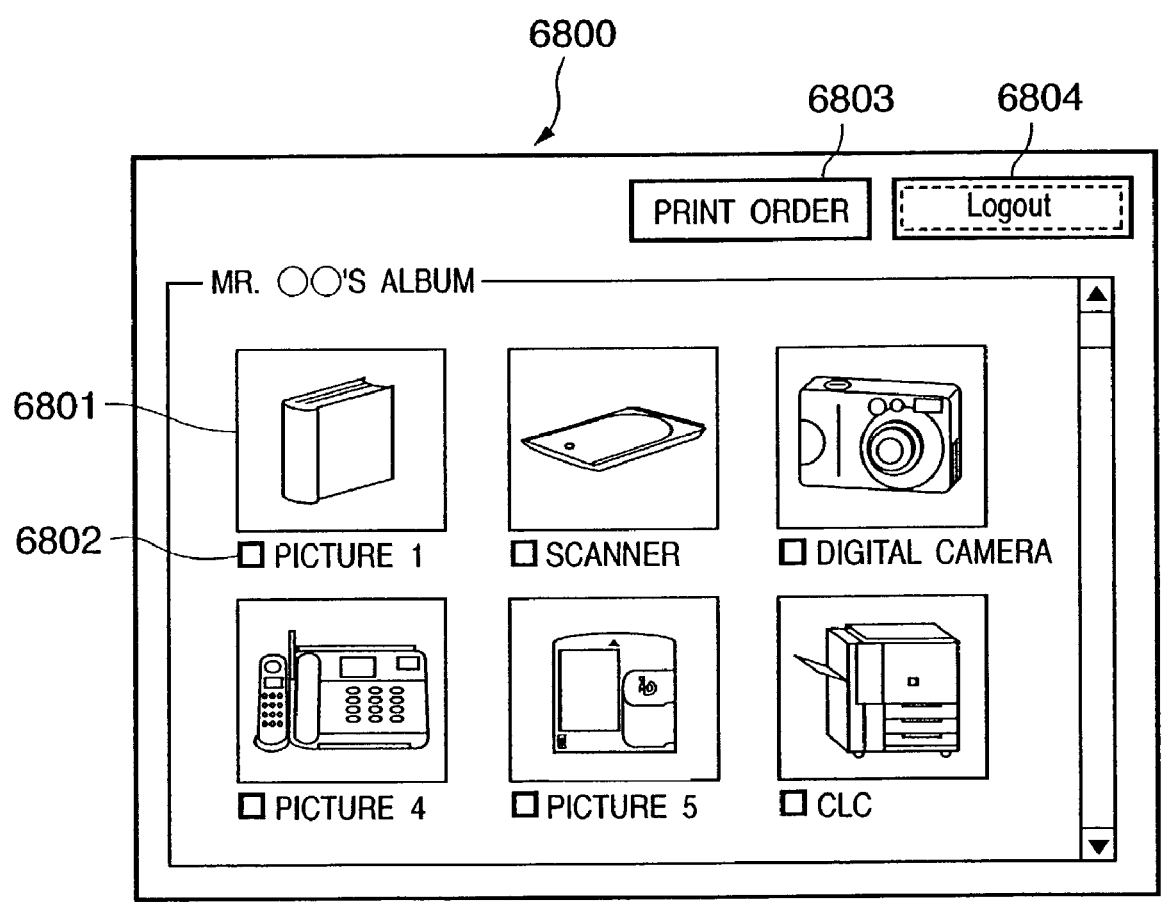
FIG. 33 is a view showing an example of the album browse window transmitted from the photosite server according to the embodiment of the present invention.

When the OK button 6701 on the album browse start window 6700 is pressed, for example, an album browse window 6800 shown in FIG. 33 is displayed with respect to an album for which no password is set or an album for which a password is properly input. The contents of this window are the same as that of the album display area 2923 on the service provision initial window 2900. If a password is not properly input, the display data of the error window 2500 shown in FIG. 15 is transmitted. When the OK button 2501 is pressed, the display data of the album browse start window 6700 is transmitted.

In addition, the value of the print permission/inhibition flag 707 is acquired from the album information data table 700, and the display data of the album browse window 6800 including a button 6803 associated with an album that can be printed is transmitted. When the user checks a check box corresponding to a desired image and presses the button 6803, a print order can be given. In this case, the flow of print order processing is almost the same as that described with respect to an upload user except that no added value (point) is added in the photosite server 105, and hence a description thereof will be omitted.

(Browsing from Portable Terminal)

Figure 36:
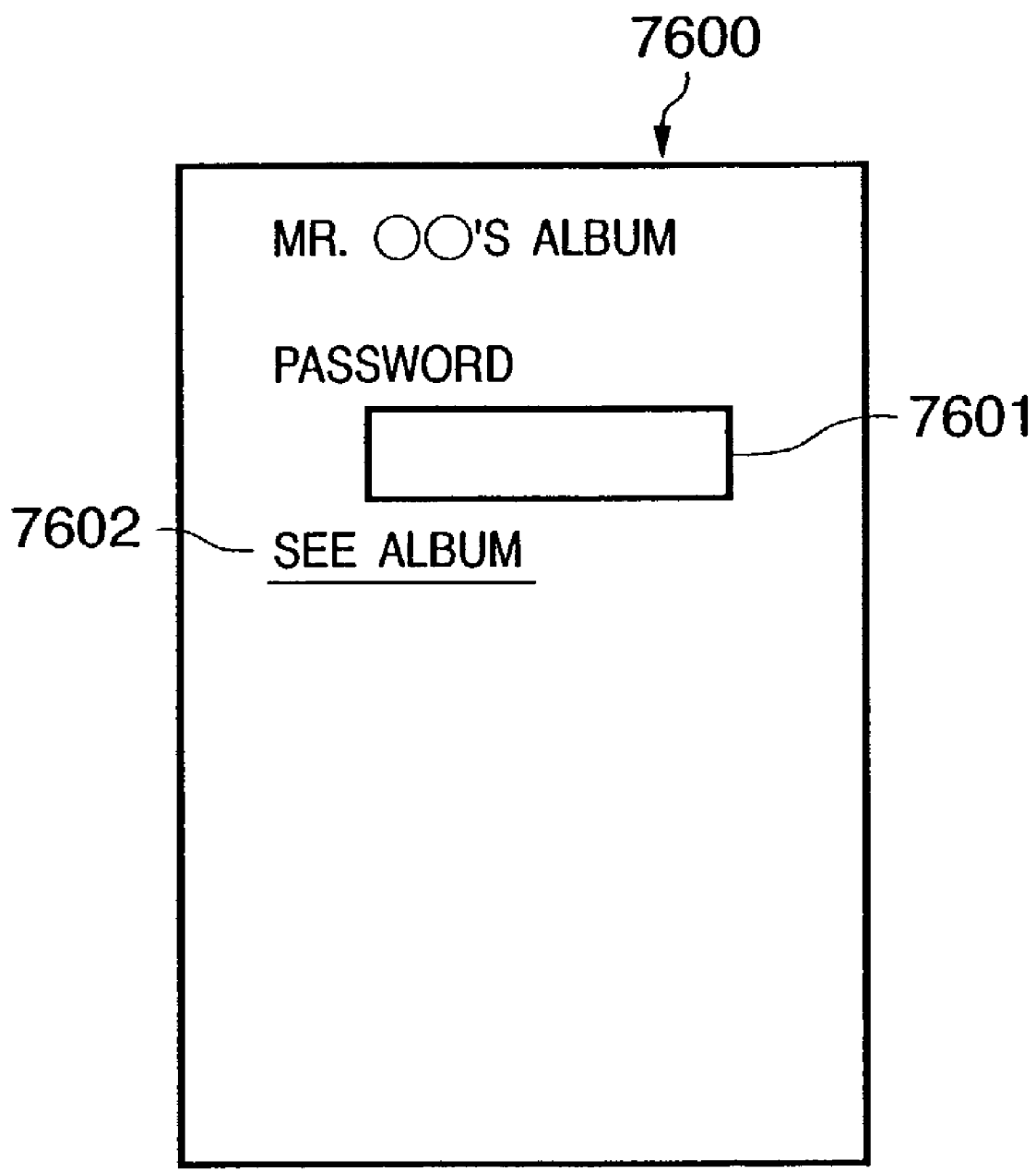
FIG. 36 is a view showing an example of the album browse start window transmitted from the photosite server according to the embodiment of the present invention when a portable browse user accesses the URL written in notification mail.

A portable browse start window 7600 shown in FIG. 36 is an example of the window displayed on the display of the portable terminal 113 at the time of browsing from the portable terminal. In response to a browse request from the user, the photosite server 105 acquires the information of the terminal which has generated the request to check whether the browse request has been generated by a portable terminal or PC. If the browse request is generated by the portable terminal, the display data of the portable browse start window 7600 shown in FIG. 36 is transmitted. Note that the contents of this window are the same as those of the album browse start window 6700. The window 7600 is displayed when the user accesses the URL indicated by the notification mail shown in FIG. 27. This window is also displayed when the user inputs the album ID written in the notification mail in an album ID input area 7801 on a window 7800 shown in FIG. 38 and selects a button 7802.

Figure 37:
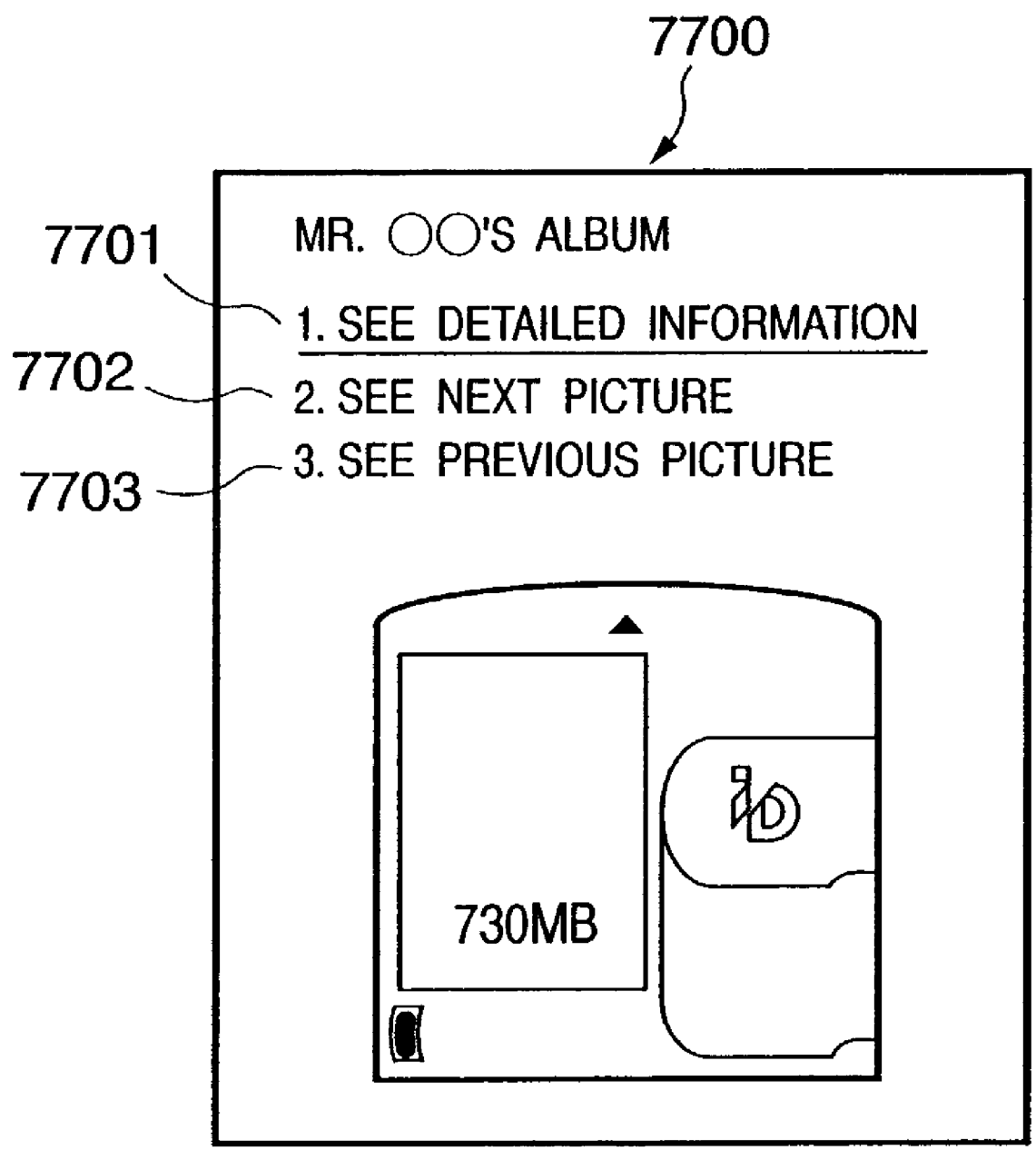
FIG. 37 is a view showing an example of the album browse window transmitted from the photosite server according to the embodiment of the present invention to a portable browse user.

When a button 7602 on the window 7600 is pressed, a portable browse window 7700 shown in FIG. 37 is displayed. The photosite server 105 transmits display data with a reduced image size which is used for portable terminals. In addition, the images in the album are separated from each other to be display one by one in accordance with selection of a next image or previous image. When a button 7701 is pressed, detailed information such as an image name and comment is transmitted. The contents of this display are the same as those displayed with respect to each image on the detailed display window in FIG. 26. In addition, the displayed images in the album can be updated one by one by pressing buttons 7702 and 7703.

In the above embodiment, when the user inputs an album ID through the user PC 102A, the number is transferred to the photosite server 105, and the photosite server 105 analyzes the input number. If, however, the user PC 102A is equipped with an analysis module for performing processing similar to the browse number processing executed by the photosite server 105, determination of an album Id can be done on the user PC side. In this case, since the determination processing in the photosite server 105 is reduced, the load on the photosite server 105 can be reduced.

The above embodiment has exemplified only the photosite server formed from one device. However, the same function as that of the server apparatus of the present invention may be implemented by a system constituted by a plurality of devices.

The present invention also incorporates a case wherein a software program for implementing the function of the above embodiment (a program corresponding to at least one of the flow charts of FIGS. 10, 20, 21, 25, 41, 28, 30, 31, and 34) is supplied to a system or apparatus having a computer capable of executing the program from a recording medium directly or by wire/wireless communication, and a similar function is implemented by making the computer of the system or apparatus execute the supplied program.

The program codes themselves which are supplied and installed in the computer to allow the computer to implement the function/processing of the present invention also realize the present invention. That is, the computer program itself, which implements the function/processing of the present invention, is also incorporated in the present invention.

In this case, the program may take any form, e.g., an object code, a program executed by an interpreter, and script data supplied to an OS, as long as it has the function of the program.

As a recording medium for supplying the program, a floppy disc, a hard disc, a magnetic recording medium such as a magnetic tape, an optical/magnetooptical storage medium such as an MO, a CD-ROM, a CD-R, CD-RW, DVD-ROM, DVD-R, or DVD-RW, a nonvolatile semiconductor memory, or the like can be used.

An example of the method of supplying the program by wire/wireless communication is a method of storing, in the server on the computer network, the computer program itself which implements the present invention or a data file (program data file) which can be a computer program for implementing the present invention in a client computer, e.g., a compressed file including an automatic installation function, and downloading the program data file to a connected client computer. In this case, the program data file can be divided into a plurality of segment files, and the segment files can be stored in different servers.

That is, the present invention incorporates a server apparatus which downloads the program data file for allowing a computer to implement the function/processing of the present invention to a plurality of users.

In addition, the following operation can be performed. The program of the present invention is encrypted and stored in a storage medium such as a CD-ROM. Such storage media are then distributed to users. A user who satisfies a predetermined condition is allowed to download key information for decryption from, for example, a home page through the Internet. The user executes the encrypted program by using the key information to make the computer install the program, thereby implementing the function/processing of the present invention.

The function of the above embodiment is realized not only when the readout program is executed by the computer but also when the OS or the like running on the computer performs part or all of actual processing on the basis of the instructions of the program.

The function of the above embodiment is also realized when the program read out from the storage medium is written in the memory of a function expansion board inserted into the computer or a function expansion unit connected to the computer, and the CPU of the function expansion board or function expansion unit or the like performs part or all of actual processing on the basis of the instructions of the program.

As has been described above, according to the server apparatus and its control method according to the present invention, by encrypting an access code notified to the third party, access protection against unauthorized users can be provided, and the load on the server apparatus can be reduced.

Furthermore, the present invention can be applied to the system comprising either a plurality of units or a single unit. It is needless to say that the present invention can be applied to the case which can be attained by supplying programs which execute the process defined by the present system of invention.

What is claimed is:

1. An image data providing server that communicates via a network with an external device, and that provides image data to the external device, comprising:

an electronic album storage unit configured to store a plurality of image data received from a user terminal and to store the received plurality of image data as an album in association with an album identification;

a generation unit configured to generate a disclosure album ID for the album corresponding to the plurality of image data stored in the electronic album storage unit by a) generating a first check digit by performing a predetermined check digit generation process utilizing the album identification stored in the electronic album storage unit in association with the album, and b) adding the generated first check digit to the album identification, the generated disclosure album ID being constituted by the album identification and the first check digit;

a issuing unit configured to issue the generated disclosure album ID to the external device;

a receiving unit configured to receive, from the external device, a request for browsing an album stored in the electronic album storage unit, the request including a disclosure album ID;

a computing unit configured to a) extract an album identification from the received disclosure album ID, b) to compute a second check digit by applying the predetermined check digit generation process to the extracted album identification contained in the received disclosure album ID and c) to obtain a resultant ID by adding the second check digit to the album identification contained in the received disclosure album ID;

a comparing unit configured to compare the obtained the resultant ID with the received disclosure album ID;

a determining unit configured to determine whether or not the received disclosure album ID is proper, and determines that the received disclosure album ID is proper in a case where a result of the comparison by said comparing unit indicates that the obtained resultant ID coincides with the received disclosure album ID, and otherwise determines that the received disclosure album ID is not proper;

a first transmission unit configured to, in a case where the determining unit determines that the received disclosure album ID is not proper, transmit display data of an error window to the external device;

a search controlling unit configured to control a search unit to search the electronic album storage unit, utilizing the extracted album identification, for image data associated with an album identification corresponding to the extracted album identification contained in the received disclosure album ID, in a case where the result of the determination by the determining unit indicates that the received disclosure album ID is proper;

an image data obtaining unit configured to obtain the image data from the electronic album storage unit in a case where the search unit finds an album identification corresponding to the extracted album identification stored in the electronic album storage unit;

a second transmission unit configured to transmit, to the external device, display information for displaying the image data obtained from the electronic album storage unit by the image data obtaining unit; and a third transmission unit configured to transmit, to the external device, display data of an error window in a case where the search unit does not find an album identification corresponding to the extracted album identification stored in the electronic album storage unit.

2. The image data providing server according to claim 1, further comprising an encryption unit configured to encrypt the disclosure album ID issued by said issuing unit.

3. The image data providing server according to claim 1, wherein the disclosure album ID issued by said issuing unit includes information indicating a location of said image data providing server on the network.

4. An image data providing method performed by an image data providing server that communicates via a network with an external device and that provides image data to the external device, the method comprising:

an electronic album storage step of storing, in an electronic album storage unit, a plurality of image data received from a user terminal and storing the received plurality of image data as an album in association with an album identification;

a generation step of generating a disclosure album ID for the album corresponding to the plurality of image data stored in the electronic album storage unit by a) generating a first check digit by performing a predetermined check digit generation process utilizing the album identification stored in the electronic album storage unit in association with the album, and b) adding the generated first check digit to the album identification, the generated disclosure album ID being constituted by the album identification and the first check digit;

an issuing step of issuing the generated disclosure album ID to the external device;

a receiving step of receiving, from the external device, a request for browsing an album stored in the electronic album storage unit, the request including a disclosure album ID;

a computing step of a) extracting an album identification from the received disclosure album ID, b) computing a second check digit by applying the predetermined check digit generation process to the extracted album identification contained in the received disclosure album ID and c) obtaining a resultant ID by adding the second check digit to the album identification contained in the received disclosure album ID;

a comparing step of comparing the obtained resultant ID with the received disclosure album ID;

a determining step of determining whether or not the received disclosure album ID is proper, and determining that the received disclosure album ID is proper in a case where a result of the comparison by said comparing step indicates that the obtained resultant ID coincides with the received disclosure album ID, and otherwise determining that the received disclosure album ID is not proper;

a first transmission step of, in a case where the determining step determines that the received disclosure album ID is not proper, transmitting display data of an error window to the external device;

a search controlling step of controlling a search unit to search the electronic album storage unit, utilizing the extracted album identification, for image data associated with an album identification corresponding to the extracted album identification contained in the received disclosure album ID, in a case where the result of the determination by the determining step indicates that the received disclosure album ID is proper;

an image data obtaining step of obtaining the image data from the electronic album storage unit in a case where the search finds an album identification corresponding to the extracted album identification stored in the electronic album storage unit;

a second transmission step of transmitting, to the external device, display information for displaying the image data obtained from the electronic album storage unit by the image data obtaining step; and a third transmission step of transmitting, to the external device, display data of an error window in a case where the search does not find an album identification corresponding to the extracted album identification stored in the electronic album storage unit.

5. The method according to claim 4, further comprising an encryption step of encrypting the disclosure album ID issued by said issuing step.

6. The method according to claim 4, wherein the disclosure album ID issued by said issuing step includes information indicating a location of said image data providing server on the network.

7. A computer-readable storage medium on which is stored a computer-readable program for executing a data providing method performed by an image data providing server that communicates via a network with an external device, and that provides image data to the external device, the program comprising:

an electronic album storage step of storing, in an electronic album storage unit, a plurality of image data received from a user terminal and storing the received plurality of image data as an album in association with an album identification;

a generation step of generating a disclosure album ID for the album corresponding to the plurality of image data stored in the electronic album storage unit by a) generating a first check digit by performing a predetermined check digit generation process utilizing the album identification stored in the electronic album storage unit in association with the album, and b) adding the generated first check digit to the album identification, the generated disclosure album ID being constituted by the album identification and the first check digit;

an issuing step of issuing the generated disclosure album ID to the external device;

a receiving step of receiving, from the external device, a request for browsing an album stored in the electronic album storage unit, the request including a disclosure album ID;

a computing step of a) extracting an album identification from the received disclosure album ID, b) computing a second check digit by applying the predetermined check digit generation process to the extracted album identification contained in the received disclosure album ID and c) obtaining a resultant ID by adding the second check digit to the album identification contained in the received disclosure album ID;

a comparing step of comparing the obtained resultant ID with the received disclosure album ID;

a determining step of determining whether or not the received disclosure album ID is proper, and determining that the received disclosure album ID is proper in a case where a result of the comparison by said comparing step indicates that the obtained resultant ID coincides with the received disclosure album ID, and otherwise determining that the received disclosure album ID is not proper;

a first transmission step of, in a case where the determining step determines that the received disclosure album ID is not proper, transmitting display data of an error window to the external device;

a search controlling step of controlling a search unit to search the electronic album storage unit, utilizing the extracted album identification, to obtain image data associated with an album identification corresponding to the extracted album identification contained in the received disclosure album ID, in a case where the result of the determination by the determining step indicates that the received disclosure album ID is proper;

an image data obtaining step of obtaining the image data from the electronic album storage unit in a case where the search finds an album identification corresponding to the extracted album identification stored in the electronic album storage unit;

a second transmission step of transmitting, to the external device, display information for displaying the image data obtained from the electronic album storage unit by the image data obtaining step; and a third transmission step of transmitting, to the external device, display data of an error window in a case where the search does not find an album identification corresponding to the extracted album identification stored in the electronic album storage unit.

8. The computer-readable storage medium according to claim 7, further comprising an encryption step of encrypting the disclosure album ID issued by said issuing step.

9. The computer-readable storage medium according to claim 7, wherein the disclosure album ID issued by said issuing step includes information indicating a location of said image data providing server on the network.

* * * * *